United States Patent
Bernhard et al.

(10) Patent No.: US 11,258,722 B2
(45) Date of Patent: *Feb. 22, 2022

(54) TELEGRAM SPLITTING TRANSMISSION METHOD FOR BIDIRECTIONAL NETWORKS

(71) Applicants: Fraunhofer-Gesellschaft zur Förderung der angewandten Forschung e.V., Munich (DE); Friedrich-Alexander-Universitaet Erlangen-Nuernberg, Erlangen (DE)

(72) Inventors: Josef Bernhard, Nabburg (DE); Johannes Wechsler, Spalt (DE); Gerd Kilian, Erlangen (DE); Jakob Kneißl, Fürth (DE); Jörg Robert, Uttenreuth (DE); Albert Heuberger, Erlangen (DE)

(73) Assignees: FRAUNHOFER-GESELLSCHAFT ZUR FORDERUNG DER ANGEWANDTEN FORSCHUNG E.V., Munich (DE); FRIEDRICH-ALEXANDER-UNIVERSITAET ERLANGEN-NEURNBERG, Erlangen (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/138,775

(22) Filed: Sep. 21, 2018

(65) Prior Publication Data

US 2019/0036833 A1   Jan. 31, 2019

Related U.S. Application Data

(63) Continuation of application No. PCT/EP2017/056832, filed on Mar. 22, 2017.

(30) Foreign Application Priority Data

Mar. 24, 2016 (DE) ............... 10 2016 205 054.0

(51) Int. Cl.
H04L 12/50 (2006.01)
H04L 47/40 (2022.01)
(Continued)

(52) U.S. Cl.
CPC .............. *H04L 47/40* (2013.01); *H04L 1/003* (2013.01); *H04L 1/0007* (2013.01); *H04L 1/008* (2013.01);
(Continued)

(58) Field of Classification Search
CPC ....................................................... H04L 12/28
(Continued)

(56) References Cited

U.S. PATENT DOCUMENTS

2004/0047324 A1  3/2004 Diener
2004/0160916 A1  8/2004 Vukovic et al.
(Continued)

FOREIGN PATENT DOCUMENTS

CN       103874906 A      6/2014
DE  10 2011082098 A1      3/2013
(Continued)

OTHER PUBLICATIONS

Translation of KR 1020050100398, "Method and Apparatus for Transmitting Information within a Communication System", pp. 1-19, Oct. 2005.*
(Continued)

*Primary Examiner* — Dang T Ton
(74) *Attorney, Agent, or Firm* — McClure, Qualey & Rodack, LLP

(57) ABSTRACT

A data transmitter is provided, having: a generator for generating transmission data packets, configured to split a
(Continued)

first data packet into at least three transmission data packets, each of the transmission packets being shorter than the first data packet, the generator being configured to channel-encode the at least three transmission packets such that only a portion thereof is required for decoding the first data packet; a transmission element for transmitting data packets, configured to transmit the at least three transmission packets in a frequency channel via a communications channel with a time gap; a monitor element for monitoring the frequency channel, configured to recognize an interference or transmission of a further data transmitter in the frequency channel; the transmission element being configured not to transmit via the communications channel a packet, waiting for transmission, of the at least three transmission packets if an interference or transmission from a further data transmitter is recognized by the monitor element at the time of transmitting the transmission data packet.

13 Claims, 17 Drawing Sheets

(51) Int. Cl.

| | | |
|---|---|---|
| *H04L 1/00* | (2006.01) | |
| *H04L 47/36* | (2022.01) | |
| *H04L 47/41* | (2022.01) | |
| *H04L 69/22* | (2022.01) | |
| *H04B 1/715* | (2011.01) | |
| *H04J 11/00* | (2006.01) | |
| *H04B 1/7143* | (2011.01) | |

(52) U.S. Cl.
CPC .......... *H04L 1/0041* (2013.01); *H04L 47/365* (2013.01); *H04L 47/41* (2013.01); *H04L 69/22* (2013.01); *H04B 1/7143* (2013.01); *H04B 2001/7154* (2013.01); *H04B 2201/71307* (2013.01); *H04B 2201/71361* (2013.01); *H04J 11/0026* (2013.01); *H04L 1/0071* (2013.01); *H04L 2001/0093* (2013.01)

(58) Field of Classification Search
USPC ....................................................... 370/329
See application file for complete search history.

(56) References Cited

U.S. PATENT DOCUMENTS

| | | |
|---|---|---|
| 2005/0251838 A1 | 11/2005 | Chandhok et al. |
| 2006/0007953 A1 | 1/2006 | Vesma et al. |
| 2014/0176341 A1 | 6/2014 | Bernhard et al. |
| 2014/0192789 A1 | 7/2014 | Bernhard et al. |
| 2016/0050004 A1 | 2/2016 | Mallik et al. |
| 2016/0249328 A1 | 8/2016 | Bernhard et al. |
| 2017/0094485 A1* | 3/2017 | Saxena ............... H04L 41/0813 |
| 2018/0152264 A1 | 5/2018 | Kilian et al. |

FOREIGN PATENT DOCUMENTS

| | | |
|---|---|---|
| DE | 10 2011082100 A1 | 3/2013 |
| DE | 10 2012203653 B3 | 7/2013 |
| EP | 3125453 A1 | 2/2017 |
| JP | 2008-085719 A | 4/2008 |
| JP | 2008-524918 A | 7/2008 |
| KR | 1020050100398 A | 10/2005 |
| KR | 1020070010193 A | 1/2007 |
| WO | 2006/065275 A1 | 6/2006 |
| WO | 2015/128385 A1 | 9/2015 |

OTHER PUBLICATIONS

Translation of KR 1020070010193, System for Scalable Transmission of Content in a data Network, pp. 1-7, Oct. 2007.*
G. Kilian et al., Improved coverage for low-power telemetry systems using telegram splitting, in Proceedings of 2013 European Conference on Smart Objects, Systems and Technologies (SmartSysTech), 2013, pp. 1-6.
Written Opinion issued in application No. PCT/EP2017/056832.
Written Opinion dated Jun. 12, 2018, issued in application No. PCT/EP2017/056832.
DVB Technical Module MIMO Study Mission Report (Revision 20); pp. 1-170.
International Search Report dated Sep. 29, 2017, issued in application No. PCT/EP2017/056832.
Kilian, G., et al.; "Increasing Transmission Reliability for Telemetry Systems Using Telegram Splitting;" IEEE Transactions on Communications; vol. 63; No. 3; Mar. 2015; pp. 949-961.
Japanese language office action dated Oct. 29, 2019, issued in application No. JP 2018-549920, and its translation.
Korean Office Action dated Feb. 11, 2020, issued in application No. 10-2018-7030302.
English language translation of Korean Office Action dated Feb. 11, 2020 issued in application No. 10-2018-7030302.
Chinese language office action dated Sep. 27, 2021, issued in application No. CN 201780032316.0.
English language translation of office action dated Sep. 27, 2021, issued in application No. CN 201780032316.0.

\* cited by examiner

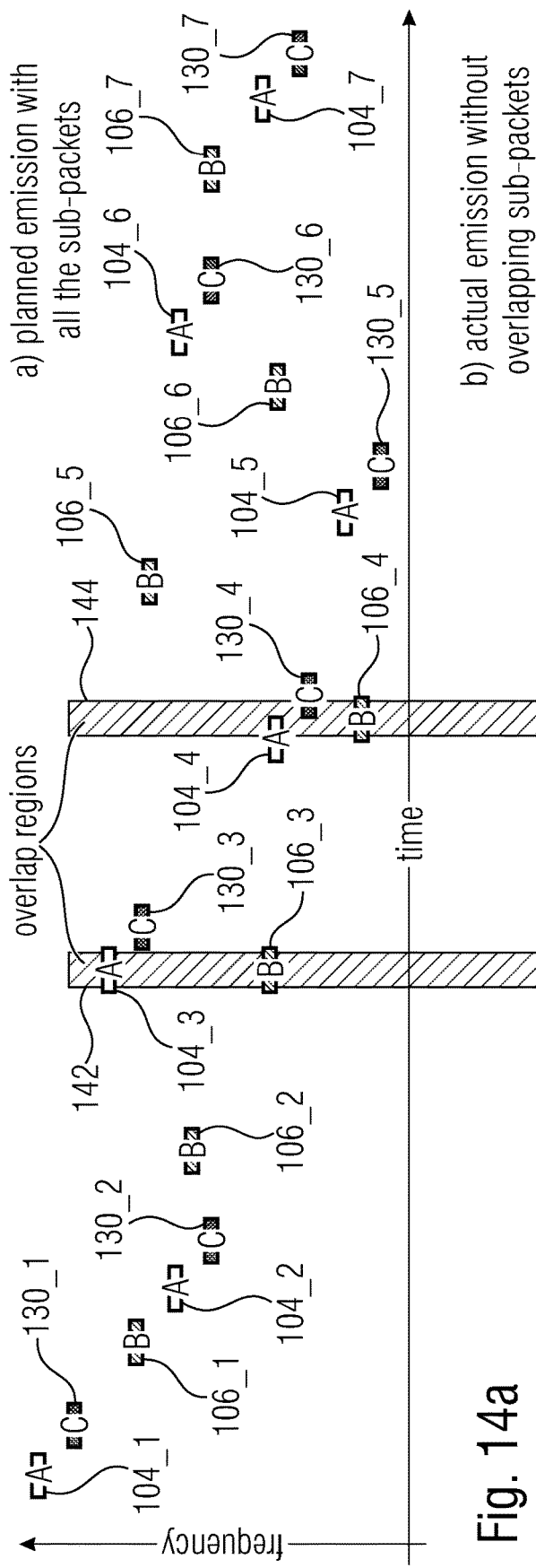
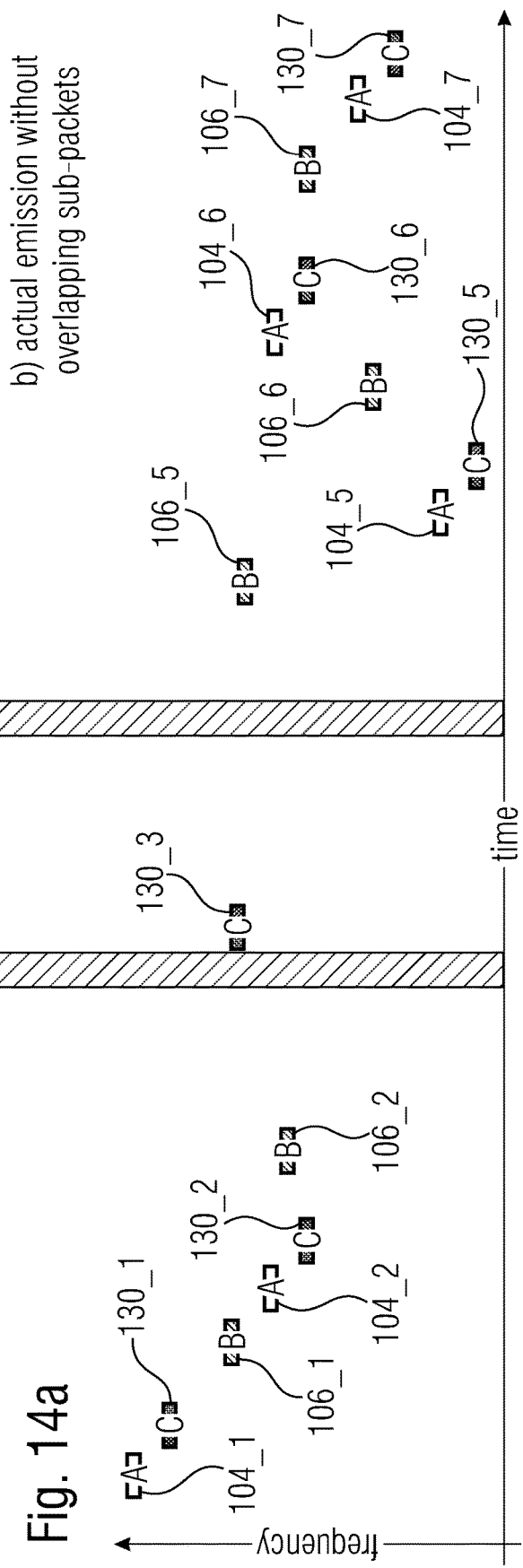
Fig. 14a
Fig. 14b

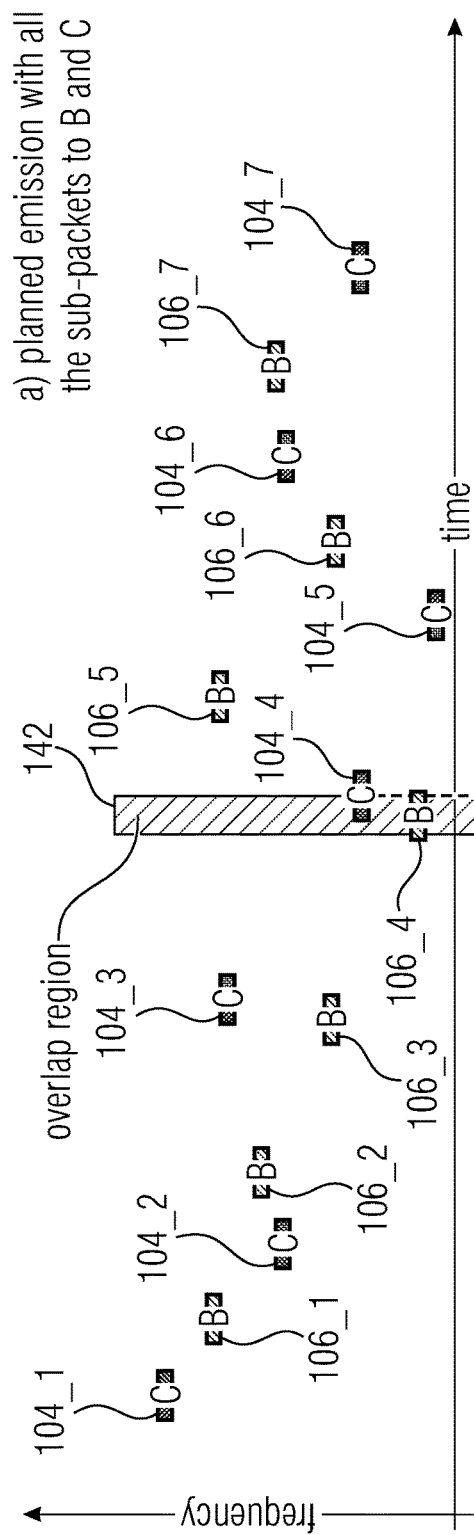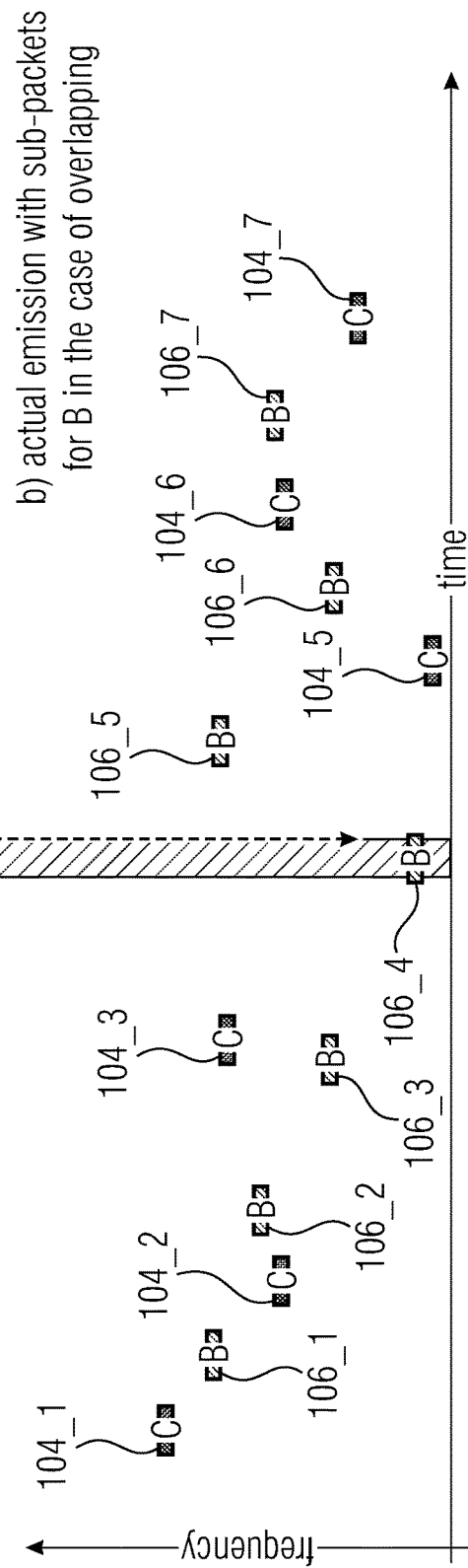

220

```
┌─────────────────────────────────────────────┐
│  Generating at least three transmission data packets
│  by splitting a first data packet destined for a first data
│  receiver into the at least three transmission data packets,
│  wherein each of the at least three transmission
│  data packets is shorter than the first data packet,
│  wherein, when generating the at least three transmission
│  data packets, the at least three transmission data packets
│  are channel-encoded such that only a portion of the
│  transmission data packets is required for decoding
│  the first data packet;
└─────────────────────────────────────────────┘
```
— 222

↓

```
┌─────────────────────────────────────────────┐
│  Transmitting the at least three transmission data packets
│  in a frequency channel via a communications channel
│  with a time gap, wherein, when transmitting the
│  at least three transmission data packets, a transmission
│  data packet, waiting for transmission, of the at least
│  three transmission data packets is not transmitted,
│  transmitted only party or at a later time if a further
│  transmission data packet is waiting for transmission at
│  the time of transmitting the one transmission data packet.
└─────────────────────────────────────────────┘
```
— 224

Fig. 18

TELEGRAM SPLITTING TRANSMISSION METHOD FOR BIDIRECTIONAL NETWORKS

CROSS-REFERENCE TO RELATED APPLICATIONS

This application is a continuation of copending International Application No. PCT/EP2017/056832, filed Mar. 22, 2017, which is incorporated herein by reference in its entirety, and additionally claims priority from German Application No. 10 2016 205 054.0, filed Mar. 24, 2016, which is also incorporated herein by reference in its entirety.

BACKGROUND OF THE INVENTION

Embodiments of the present invention relate to a data transmitter, in particular to a data transmitter transmitting a data packet to a data receiver via a communications channel in a way split into several transmission data packets. Further embodiments relate to a data receiver, in particular to a data receiver receiving a data packet which is transmitted by a data transmitter via a communications channel in a way split into several transmission data packets. Some embodiments relate to an extension of the telegram splitting transmission method in order to utilize simultaneous transmission in bidirectional networks.

There are different unidirectional and bidirectional systems for transmitting data between a base station and nodes. Well-known systems are DECT (digital enhanced cordless telecommunications) and RFID (radio frequency identification), for example. It is typical of these systems that the base station predetermines a reference frequency and a reference time which the nodes synchronize to. Exemplarily, in RFID systems, a reader (base station) predetermines a time window, which follows directly after its emission, within which the RFID transponders (nodes) randomly select any point in time for responding manner. The predetermined time interval is additionally subdivided into time slots of equal lengths. This is referred to as a slotted ALOHA protocol. In DECT, time slots are provided within a fixed predetermined pattern. The base station associates to a participant a precise time slot it is allowed to use for communications. Due to the imprecision caused by quartz tolerance, a buffer time is provided for in between the time slots in order for the data packets not to overlap.

DE 10 2011 082 098 describes a method for battery-operated transmitters where the data packet is subdivided into transmission packets which are smaller than the actual piece of information to be transmitted (so-called telegram splitting). Here, telegrams are split into several partial packets or sub-packets. Several information symbols are transmitted in a sub-packet. The sub-packets are distributed on a frequency or else over several frequencies, which is called frequency hopping. There are pauses between the sub-packets where no transmission takes place.

In addition, in [G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013], a low-energy telegram splitting system of improved network coverage is described.

Also, G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015] describe how the transmission reliability can be improved in telegram splitting telemetry systems.

However, caused by channels affected by interference, collisions and, consequently, data losses still occur when transmitting data between a large number of participants in a network of low data throughput and high range.

Consequently, the object underlying the present invention is providing a concept of further increasing the channel utilization or transmission reliability in the case of data transmission between a large number of participants while using a channel affected by interference.

SUMMARY

According to an embodiment, a data transmitter may have: means for generating transmission data packets, configured to split a first data packet into at least three transmission data packets, wherein each of the at least three transmission data packets is shorter than the first data packet, the means for generating data packets being configured to channel-encode the at least three transmission data packets such that only a portion of the transmission data packets is required for decoding the first data packet; means for transmitting data packets, configured to transmit the at least three transmission data packets in a frequency channel via a communications channel with a time gap; means for monitoring the frequency channel, configured to recognize an interference or transmission of a further data transmitter in the frequency channel; wherein the means for transmitting data packets is configured not to transmit, transmit only partly or at a later time via the communications channel a transmission data packet, waiting for transmission, of the at least three transmission data packets if an interference or transmission from a further data transmitter is recognized by the means for monitoring the frequency channel at the time of transmitting the transmission data packet.

According to another embodiment, a data transmitter may have: means for generating transmission data packets, configured to split a first data packet into at least three transmission data packets, wherein each of the at least three transmission data packets is shorter than the first data packet, the means for generating data packets being configured to channel-encode the at least three transmission data packets such that only a portion of the transmission data packets is required for decoding the first data packet; means for transmitting data packets, configured to transmit the at least three transmission data packets via a communications channel with a time gap; wherein the means for transmitting data packets is configured not to transmit, transmit only partly or at a later time a transmission data packet, waiting for transmission, of the at least three transmission data packets; wherein the means for transmitting data packets is configured not to transmit a transmission data packet, waiting for transmission, of the at least three transmission data packets if there is a further transmission data packet waiting for transmission at the time of transmitting the one transmission data packet; and wherein the means for transmitting data packets is configured to transmit the further transmission data packet via the communications channel.

According to still another embodiment, a system may have: at least one data transmitter as mentioned above; and at least one data receiver, the data receiver having: means for receiving data packets, configured to receive at least three transmission data packets from a first data transmitter, which are transmitted via a communications channel with a time gap and each contain part of a first data packet, the means for receiving data packets being configured to combine the at least three transmission data packets in order to obtain the first data packet; wherein the at least three transmission data packets are channel-encoded such that only a portion of the at least three transmission data packets is required for decoding; wherein the means for receiving data packets is configured to receive, combine and decode at least two of the at least three transmission data packets in order to obtain the first data packet.

According to another embodiment, a method may have the steps of: generating at least three transmission data packets by splitting a first data packet destined for a first data receiver into the at least three transmission data packets, wherein each of the at least three transmission data packets is shorter than the first data packets, wherein, when generating the at least three transmission data packets, the at least three transmission data packets are channel-encoded such that only a portion of the transmission data packets is required for decoding the first data packet; transmitting the at least three transmission data packets in a frequency channel via a communications channel with a time gap; monitoring the frequency channel in order to recognize an interference or transmission of a further data transmitter in the frequency channel; wherein the means for transmitting data packets is configured not to transmit, transmit only partly or at a later time via the communications channel a transmission data packet, waiting for transmission, of the at least three transmission data packets if an interference or transmission from a further data transmitter is recognized by the means for monitoring the frequency channel at the time of transmitting the transmission data packet; wherein, when transmitting the at least three transmission data packets, a transmission data packet, waiting for transmission, of the at least three transmission data packets is not transmitted, transmitted only partly or at a later time if an interference or transmission from a further data transmitter is recognized by monitoring the frequency channel at the time of transmitting the transmission data packet.

Another embodiment may have a computer program for performing a method having the steps of: generating at least three transmission data packets by splitting a first data packet destined for a first data receiver into the at least three transmission data packets, wherein each of the at least three transmission data packets is shorter than the first data packets, wherein, when generating the at least three transmission data packets, the at least three transmission data packets are channel-encoded such that only a portion of the transmission data packets is required for decoding the first data packet; transmitting the at least three transmission data packets in a frequency channel via a communications channel with a time gap; monitoring the frequency channel in order to recognize an interference or transmission of a further data transmitter in the frequency channel; wherein the means for transmitting data packets is configured not to transmit, transmit only partly or at a later time via the communications channel a transmission data packet, waiting for transmission, of the at least three transmission data packets if an interference or transmission from a further data transmitter is recognized by the means for monitoring the frequency channel at the time of transmitting the transmission data packet; wherein, when transmitting the at least three transmission data packets, a transmission data packet, waiting for transmission, of the at least three transmission data packets is not transmitted, transmitted only partly or at a later time if an interference or transmission from a further data transmitter is recognized by monitoring the frequency channel at the time of transmitting the transmission data packet.

Embodiments provide a data transmitter. The data transmitter comprises means for generating transmission data packets, configured to split a first data packet destined for a first data receiver into at least two transmission data packets, wherein each of the transmission data packets destined for the first data receiver is shorter than the first data packet. In addition, the data transmitter comprises means for transmitting data packets, configured to transmit the at least two transmission data packets destined for the first data receiver via a communications channel with a time gap. Thus, the means for transmitting data packets is configured to transmit at least one further transmission data packet to the first data receiver or a second data receiver in the time gap (or temporal distance) between the at least two transmission data packets destined for the first data receiver.

In embodiments, the data transmitter may thus make use of the time gap (like interval, pause) between two transmission data packets or between emitting two transmission data packets, in order to emit (at least) one further transmission data packet, thereby improving channel occupation or channel utilization.

Further embodiments provide a data transmitter. The data transmitter comprises means for generating transmission data packets, configured to split a first data packet into at least three transmission data packets, wherein each of the at least three transmission data packets is shorter than the first data packet, the means for generating data packets being configured to channel-encode the at least three transmission data packets such that only a portion of the transmission data packets is needed for decoding the first data packet. Additionally, the data transmitter comprises means for transmitting data packets, configured to transmit the at least three transmission data packets in a frequency channel over a communications channel with a time gap. Furthermore, the data transmitter comprises means for monitoring the frequency channel, configured to recognize an interference or transmission of a further data transmitter in the frequency channel. Thus, the means for transmitting data packets is configured not to transmit, transmit only partly or at a later time via the communications a transmission data packet, waiting for transmission or pending transmission, of the at least three transmission data packets channel if an interference or transmission from a further data transmitter is recognized by the means for monitoring the frequency channel at the time of the planned emission of the data packet.

In embodiments, the data transmitter is not able to transmit, transmit only partly or at a later time via the communications channel the transmission data packet waiting for transmission when an interference or transmission from a further data transmitter is recognized. Due to the channel encoding used by which the transmission data packets are channel-encoded, it is even possible not to emit or only to emit partly one (or several) of the transmission data packets, with no data loss or information loss resulting, since only a portion, that is not all of the transmission data packets is/are needed for decoding the first data packet.

Further embodiments provide a data transmitter. The data transmitter comprises means for generating transmission data packets, configured to split a first data packet into at least three transmission data packets, wherein each of the at least three transmission data packets is shorter than the first data packet, the means for generating data packets being configured to channel-encode the at least three transmission data packets such that only a portion of the transmission data packets is needed for decoding the first data packet. Additionally, the data transmitter comprises means for transmitting data packets, configured to transmit the at least three transmission data packets via a communications channel with a time gap. Thus, the means for transmitting data packets is configured not to transmit, transmit only partly or at a later time a transmission data packet, waiting for transmission, of the at least three transmission data packets.

In embodiments, the data transmitter can thus not transmit, transmit only partly or at a later time via the communications channel the transmission data packet, waiting for transmission, of the at least three transmission data packets when a further transmission data packet is waiting for transmission at the time of transmitting the one transmission data packet, for example. Due to the channel encoding used, using which the transmission data packets are channel-encoded, it is even possible not to emit or only emit partly one (or several) of the transmission data packets, with no data loss or information loss resulting, since only a portion, that is not all of the transmission data packets is/are needed for decoding the first data packet.

Further embodiments provide a data receiver. The data receiver comprises means for receiving data packets, configured to receive at least two transmission data packets from a first data transmitter, which are transmitted via a communications channel with a time gap and each contain a part of a first data packet, the means for receiving data packets being configured to combine the at least two transmission data packets in order to obtain the first data packet, and the means for receiving data packets being configured to receive at least one further data packet from the first data transmitter or a second data transmitter in the time gap between the at least two transmission data packets.

Further embodiments provide a system comprising one of the data transmitters described above and the data receiver described above.

In embodiments, the system may be of a bidirectional nature, comprising telegram splitting in the uplink (uplink refers to the link with a data flow direction which, from the point of view of the terminal, is in the direction towards the telecommunications network) and/or downlink (downlink refers to the link with a data flow direction which, from the point of view of a terminal, comes from the direction of the telecommunications network). Both for uplink and for downlink, the telegram splitting method can be used for every transmission or for some transmissions.

Embodiments allow an efficient data transmission between a large number of participants in a network of low data throughput and high range for being used in channels affected by interference. In embodiments, the principle of telegram splitting methods can be used for bidirectional communications. The transmission here does no longer necessarily take place between a base station and a sensor node, but may be performed between any participants. In addition, embodiments allow simultaneously transmitting and/or receiving several transmissions and additionally allow a dissolution of collisions formed by this.

Exemplarily, methods for prioritizing individual telegrams may be used. Additionally, embodiments allow relieving the channel by specific performance or power adjustments.

Omitting emissions of a reference signal or a downlink signal or an uplink signal in contrast results in losses in synchronicity between base station and sensor nodes or in data losses when transmitting. The telegram splitting method allows omitting several sub-packets when transmitting a telegram, without any data losses occurring. The underlying basic idea that not all the sub-packets are needed for transmission, allows various possibilities in communications with several participants, when transmitting by means of telegram splitting. The transmission can be improved further and the overall throughput of the network be increased by specifically controlling sub-packet transmission and sub-packet receiving. In embodiments, a telegram splitting participant is able to influence communications by means of specifically omitting or specifically emitting or receiving sub-packet information. In addition, when communicating by means of telegram splitting, embodiments allow a simultaneous overlapping transmission from and to several other participants.

Further embodiments provide a method. The method comprises a step of generating at least two transmission data packets by splitting a first data packet destined for a first data receiver into the at least two transmission data packets, wherein each of the transmission data packets destined for the first data receiver is shorter than the first data packet; a step of transmitting the at least two transmission data packets destined for the first data receiver via a communications channel with a time gap; and a step of transmitting a further transmission data packet to the first data receiver or a second data receiver in the time gap between the at least two transmission data packets destined for the first data receiver.

Further embodiments provide a method. The method comprises a step of generating at least three transmission data packets by splitting a first data packet destined for a first data receiver into the at least three transmission data packets, wherein each of the at least three transmission data packets is shorter than the first data packet, wherein, when generating the at least three transmission data packets, the at least three transmission data packets are channel-encoded such that only a portion of the transmission data packets is needed for decoding the first data packet; a step of transmitting the at least three transmission data packets in a frequency channel via a communications channel with a time gap; and a step of monitoring the frequency channel in order to recognize an interference or transmission of a further data transmitter in the frequency channel; wherein, when transmitting the at least three transmission data packets, a transmission data packet, waiting for transmission, of the at least three transmission data packets is not transmitted, transmitted only partly or at a later time via the communications channel if an interference or transmission from a further data transmitter is recognized by the means for monitoring the frequency channel at the time of transmitting the data packet.

Further embodiments provide a method. The method comprises a step of generating at least three transmission data packets by splitting a first data packet destined for a first data receiver into the at least three transmission data packets, wherein each of the at least three transmission data packets is shorter than the first data packet, wherein, when generating the at least three transmission data packets, the at least three transmission data packets are channel-encoded such that only a portion of the transmission data packets is needed for decoding the first data packet; and a step of transmitting the at least three transmission data packets in a frequency channel via a communications channel with a time gap; wherein, when transmitting the at least three transmission data packets, a transmission data packet, waiting for transmission, of the at least three transmission data packets is not transmitted, transmitted only partly or at a later time if a further transmission data packet is waiting for transmission at the time of transmitting the one transmission data packet.

Further embodiments provide a method. The method comprises a step of receiving at least two transmission data packets from a first data transmitter, wherein the at least two transmission data packets are transmitted via a communications channel with a time gap and each contain part of a first data packet; a step of combining the at least two transmission data packets in order to obtain the first data packet; and a step of receiving at least one further data packet in the time gap between the at least two transmission data packets from the first data transmitter or a second data transmitter.

BRIEF DESCRIPTION OF THE DRAWINGS

Embodiments of the present invention will be detailed subsequently referring to the appended drawings, in which:

FIG. 14*a* shows an occupation of a communications channel while considering the transmission data packets, waiting for transmission, which are partly overlapping, in a diagram;

FIG. 14*b* shows an occupation of the communications channel while considering the actually emitted transmission data packets so that there is no overlapping of transmission data packets, in a diagram;

FIG. 15*a* shows an occupation of a communications channel while considering the transmission data packets, waiting for transmission, which are partly overlapping, in a diagram;

FIG. 15*b* shows an occupation of the communications channel while considering the actually emitted transmission data packets so that there is no overlapping of transmission data packets, in a diagram;

FIG. 18 shows a flowchart of a method for transmitting data packets in accordance with an embodiment.

DETAILED DESCRIPTION OF THE INVENTION

Figure 1:
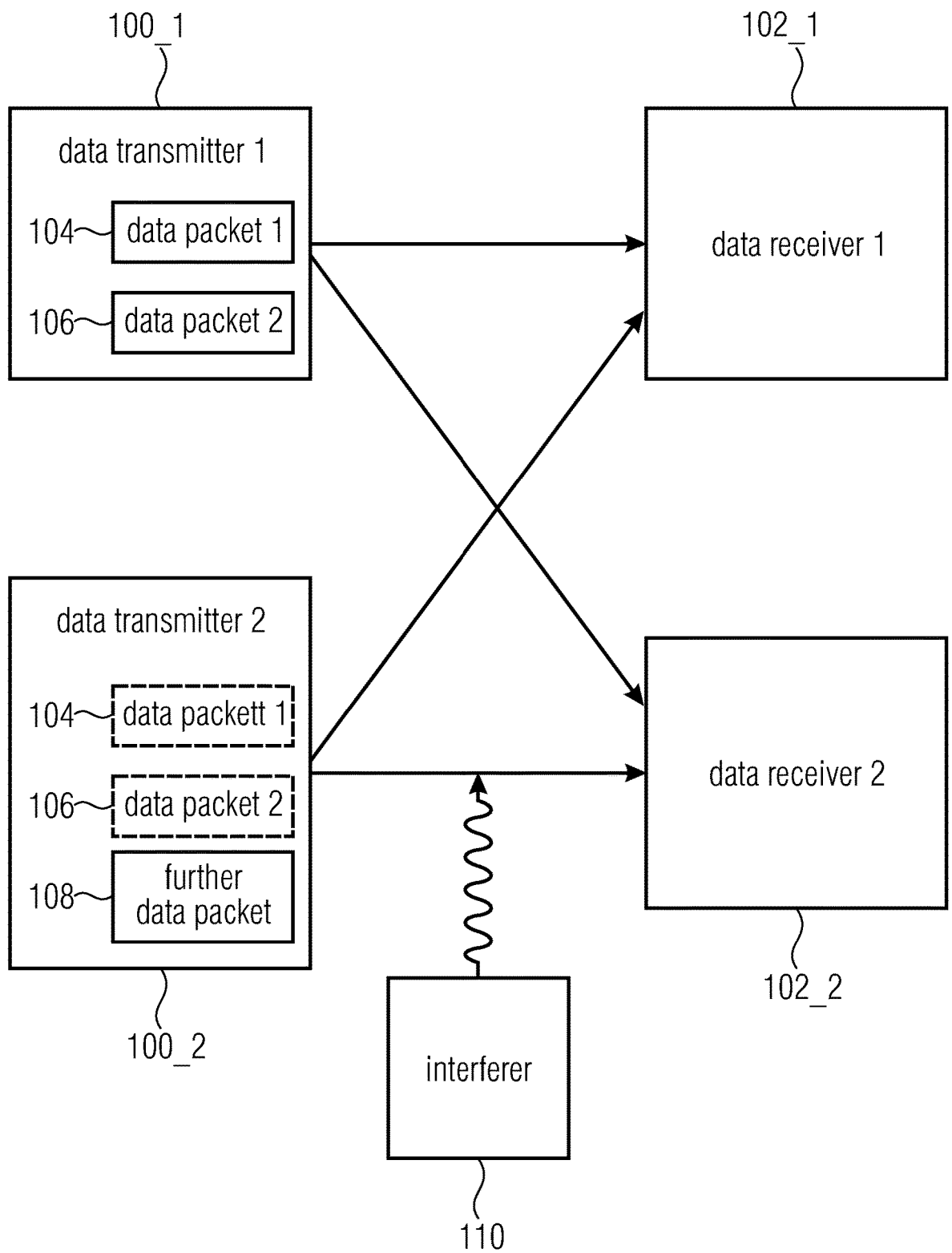
FIG. 1 is a schematic view of a communications system having at least one data transmitter and at least one data receiver.

In the following description of embodiments of the invention, equal elements or elements of equal effect in the figures are provided with equal reference numerals so that the description thereof in the different embodiments is mutually interchangeable.

However, before describing in detail embodiments of the inventive data transmitter and the inventive data receiver, an exemplary communications system where the data transmitter and the data receiver may be employed is shown making reference to FIG. 1.

In detail, FIG. 1 shows a schematic view of a communications system having at least one data transmitter 100_1 and at least one data receiver 102_1. The communications system may optionally additionally comprise a second data transmitter 100_2, wherein in this case the data transmitter 100_1 is referred to as first data transmitter 100_1. Similarly, the communications system may optionally comprise a second data receiver 102_2, wherein in this case the data receiver 102_1 is referred to as first data receiver 102_1.

The first data transmitter 100_1 and the second data transmitter 100_2 may be equal data transmitters. Similarly, the first data receiver 102_1 and the second data receiver 102_2 may be equal data receivers.

The first data transmitter 100_1 may, for example, transmit a first data packet 104 to the first data receiver 102_1 and a second data packet 106 to the second data receiver. In this case, the first data receiver 102_1 receives the first data packet 104 and the second data receiver 102_2 receives the second data packet 106.

The first data transmitter 100_1 may of course also transmit the first data packet 104 to the first data receiver 102_1 and the second data packet 106 to the second data receiver 102_2. In this case, the first data receiver 102_1 receives the first data packet 104 and the second data receiver 102_2 receives the second data packet 106.

It is of course also possible for the second data transmitter 102, instead of the first data transmitter 100_1 to transmit at least one of the two data packets 104 and 106 to the respective data receiver 102_1 and 102_2. Correspondingly, one of the two data receivers 102_1 and 102_2 may also receive both data packets 104 and 106 which may be transmitted by one or both data transmitters 100_1 and 100_2.

In addition, from the point of view of the (first) data transmitter 100_1, the second data transmitter 100_2 may be a further data transmitter 100_2 transmitting a further data packet 108. The further data transmitter 100_2 here does not have to be part of the communications system.

In addition, apart from the communications systems, there may be an interferer 110 interfering in the transmissions of the communications system.

The data transmitters may be both base stations and nodes (sensor nodes). Exemplarily, the system may be used for transmitting data from a base station, like control data for adjusting individual parameters of an actuator or sensor, to an individual or a large number of simple nodes. The radio transmission band used here usually is not reserved exclusively for this transmission, but is shared with many further systems, which makes reliable transmission of the information more difficult. In addition, suitable bands are subject to regulation which restricts the transmission time allowed over a certain period.

Since not only transmitting data, but also receiving data entails a comparatively high energy consumption, the telegram splitting method may be used for both transmitting data from the node to the base station and for transmitting data from the base station to the node. In both cases, the energy consumption of the nodes is to be kept small since these may not comprise a constant current supply, but operate, for example, a so-called energy harvesting method, that is obtain energy from their environment (differences in temperature, sunlight, electromagnetic waves etc.) or else comprise a battery which is not able to provide the current for the transmitter or receiver over a sufficiently long time.

Telegram Splitting in the Transmit Path Including Frequency Channel Monitoring

Figure 2:
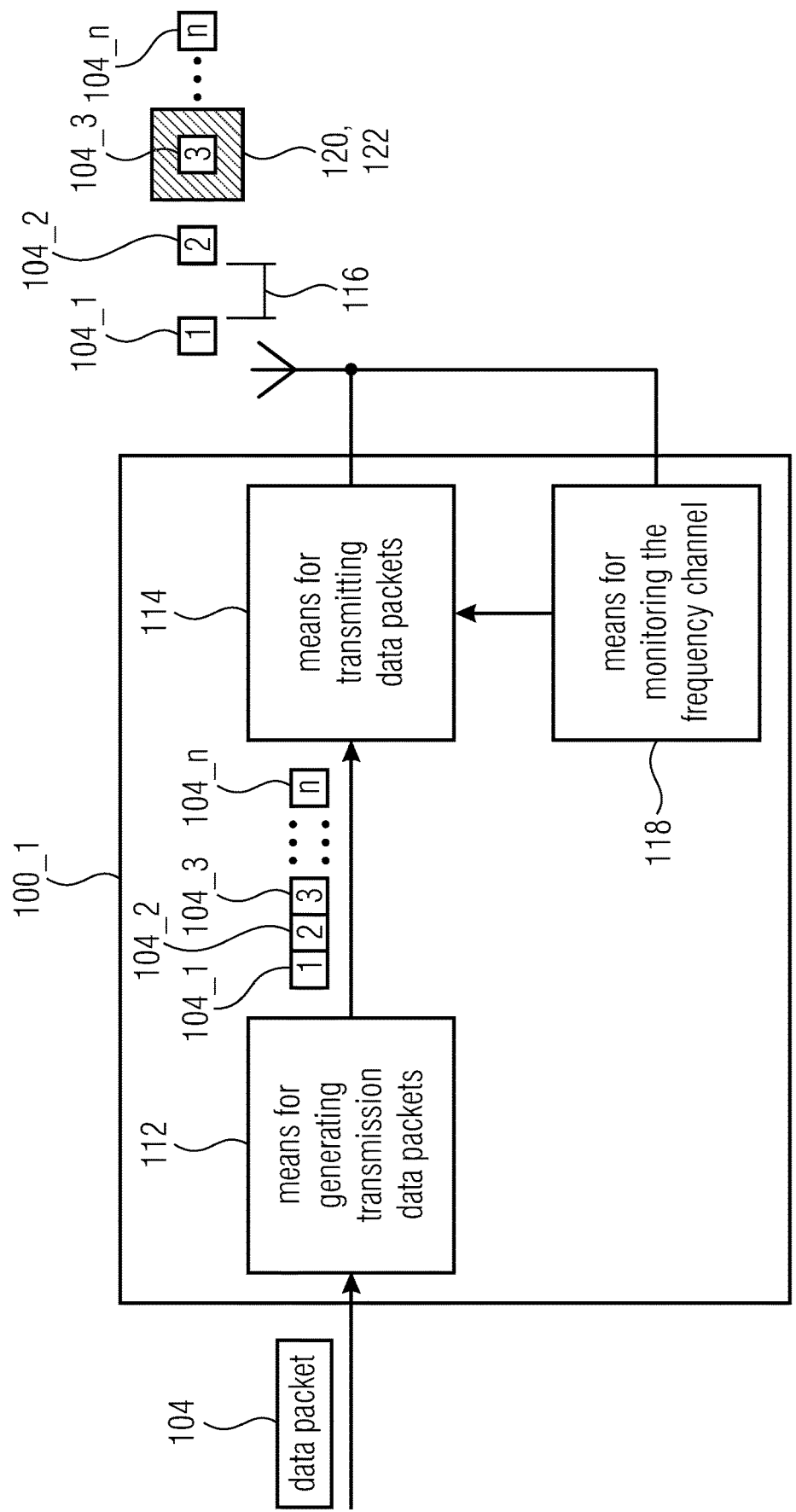
FIG. 2 is a schematic view of a data transmitter in accordance with an embodiment.

FIG. 2 shows a schematic view of the data transmitter 100_1 in accordance with an embodiment. The data transmitter 100_1 comprises means 112 for generating transmission data packets, configured to split a first data packet 104 into at least three transmission data packets 104_1 to 104_n (wherein n may be any natural number greater than or equaling three), wherein each of the at least three transmission data packets 104_1 to 104_n is shorter than the first data packet 104, the means 112 for generating data packets being configured to channel-encode the at least three transmission data packets 104_1 to 104_n such that only a portion of the transmission data packets 104_1 104_n(like (at least) two of the at least three transmission data packets 104_1 to 104_n) is needed for decoding the first data packet 104. Additionally, the data transmitter 101 comprises means 114 for transmitting data packets, configured to transmit the at least three transmission data packets 104_1 to 104_n in a frequency channel via a communications channel with a time gap 116. The data transmitter 101 additionally comprises means 118 for monitoring the frequency channel, configured to recognize interference 120 by the interferer 110 or transmission 122 of a further data transmitter 100_2 in the frequency channel. The means 114 for transmitting data packets is configured not to transmit, transmit only partly or at a later time via the communications channel a transmission data packet, waiting for transmission, of the at least three transmission data packets 104_1 to 104_n if an interference 120 or transmission 122 by a different data transmitter 100_2 is recognized by the means 118 for monitoring the frequency channel at the time of transmitting the transmission data packet.

In embodiments, the data transmitter 100_1 may thus not transmit, transmit only partly or at a later time via the communications channel the transmission data packet waiting for transmission when an interference 120 or transmission 122 by a further data transmitter 102 is recognized. Due to the channel encoding used by means of which the transmission data packets 104_1 to 104_n are channel-encoded, it is even possible not to emit, emit only partly or at a later time one (or several) of the transmission data packets, without a data loss or information loss resulting from this, since only a portion, that is not all of the transmission data packets are needed for decoding the first data packet 104.

As is shown exemplarily in FIG. 2, an interference 120 or transmission 122 of a further data transmitter 100_2 may occur shortly before the planned transmission of the third transmission data packet 104_3 and be recognized by the means 118 for monitoring the frequency channel, whereupon the means 114 for transmitting data packets does not transmit, transmit only partly or at a later point in time via the communications channel the third transmission data packet 104_3.

Exemplarily, the means 118 for monitoring the frequency channels may be configured to perform power detection in the frequency channel in order to recognize the interference 120 or transmission 122 of the further data transmitter 100_2 in the frequency channel.

Furthermore, (alternatively or additionally) the means 118 for monitoring the frequency channel may be configured to predict the interference 120 or the transmission 122 of the further data transmitter 100_2 in the frequency channel based on a previous interference or previous transmission of a further data transmitter and/or based on an interference or transmission of a further data transmitter in a frequency channel adjacent to the frequency channel.

The means 114 for transmitting data packets may additionally be configured to adjust the time gap 116 between the transmission data packets 104_1 to 104_n in dependence on the recognized interference 120 or transmission 122 of the further data transmitter 102.

The mode of functioning of the data transmitter 100_1 as shown in FIG. 2 will be discussed in greater detail below referring to the diagrams shown in FIGS. 3a and 3b.

Figure 3A:
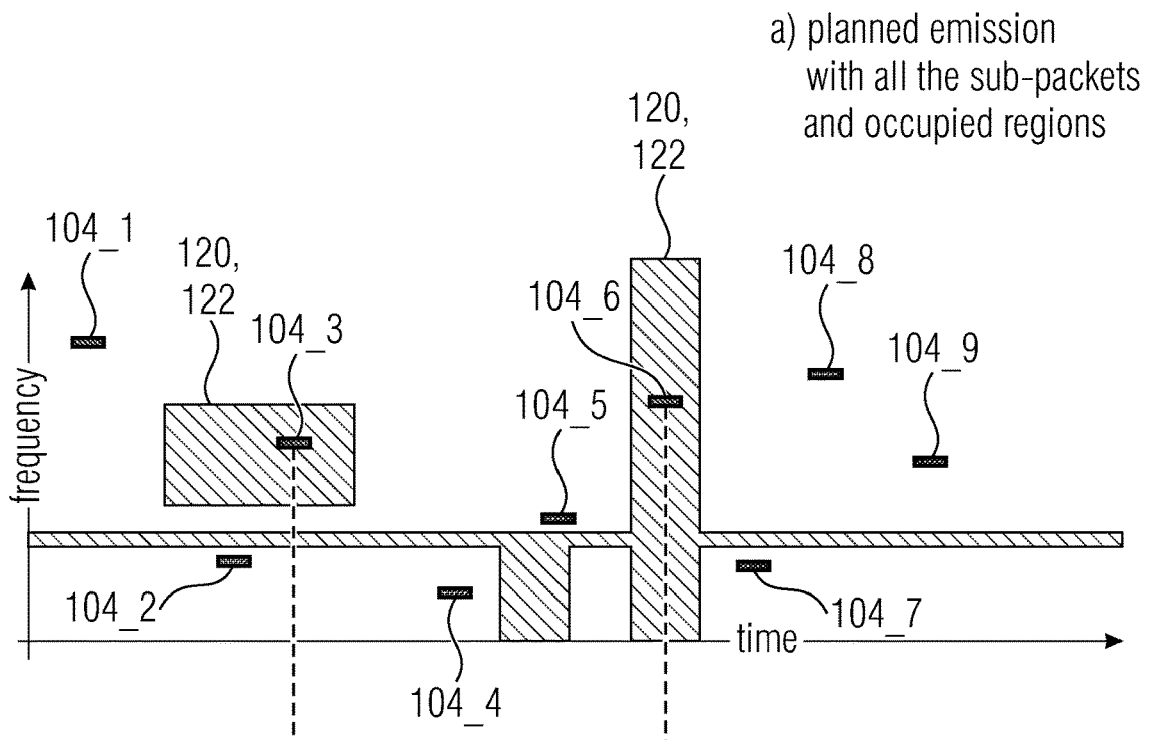
FIG. 3*a* shows an occupation of a communications channel while considering the transmission data packets waiting for transmission and an interference or a further transmission in a diagram.
Figure 3B:
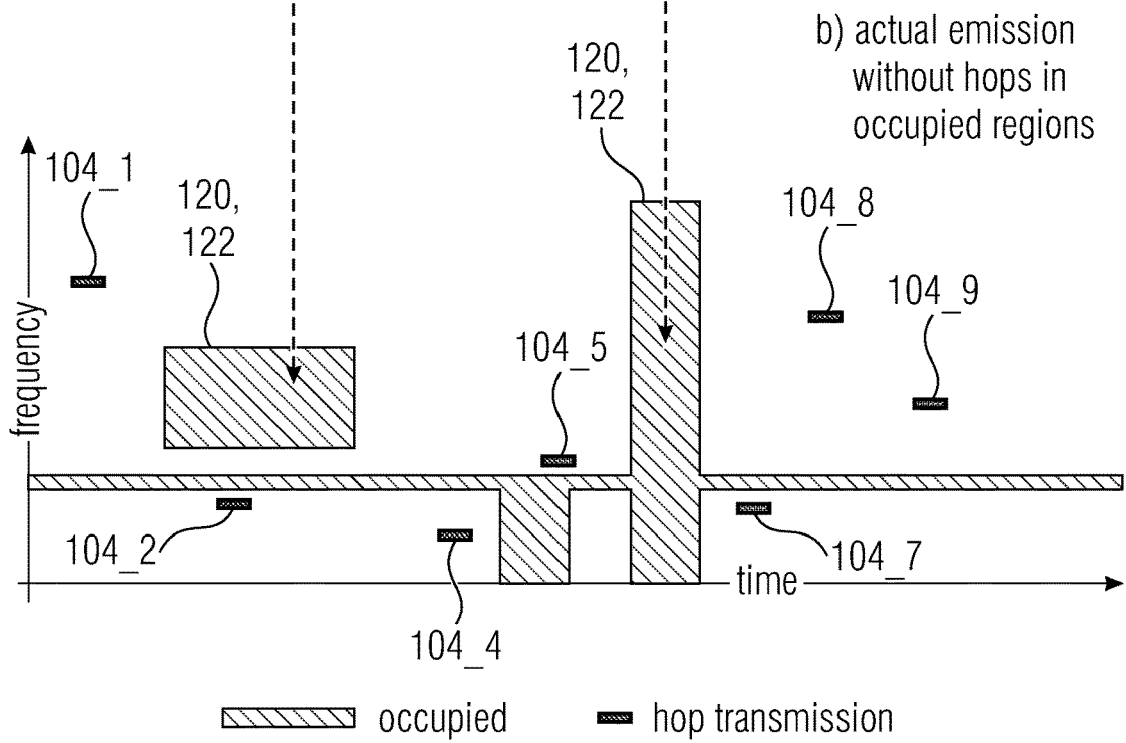
FIG. 3*b* shows an occupation of the communications channel while considering the actually emitted transmission data packets and the interference or the further transmissions in a diagram.

In detail, FIG. 3a shows an occupation of the communications channel (transmission medium) with the (planned) transmission data packets 104_1 to 104_n waiting for transmission and an interference 120 or further transmission 122 in a diagram, whereas FIG. 3b shows an occupation of the communications channel with the actually emitted transmission data packets 104_1 to 104_n while considering the interference 120 or further transmission 122 in a diagram. In FIGS. 3a and 3b, the ordinate each describes the frequency and the abscissa time.

As can be recognized in FIGS. 3a and 3b, the data transmitter 100_1 (or the means 114 for transmitting data packets) may be configured not to transmit a third transmission data packet 104_3 and a sixth transmission data packet 104_6 of the at least three transmission data packets 104_1 to 104_n due to the recognized interference 120 or further transmission 122.

As is also indicated in FIGS. 3a and 3b, the means 114 for transmitting data packets may be configured to distribute the transmission packets over several (at least two) frequency channels (or transmission frequencies).

The data transmitter 100_1 can consequently make use of the telegram splitting method in the transmit path including frequency channel monitoring (also referred to as listen-before-talk). FIGS. 2 to 3b relate to a transmission system with telegram splitting where individual sub-packets (transmission data packets) 104_1 to 104_n are not transmitted or transmitted only partly if an activity is found in the channel on that frequency range where the sub-packet is to be transmitted. An activity may, for example, take place by means of power detection in the target band of the subpacket. It is also possible to predict the activity of the channel by present observations of the past or the present neighbor channel activity. Due to error protection (channel encoding), the telegram (first data packet) 104 may also be decoded in an error-free manner while omitting transmitting some sub-packets.

Figure 4:
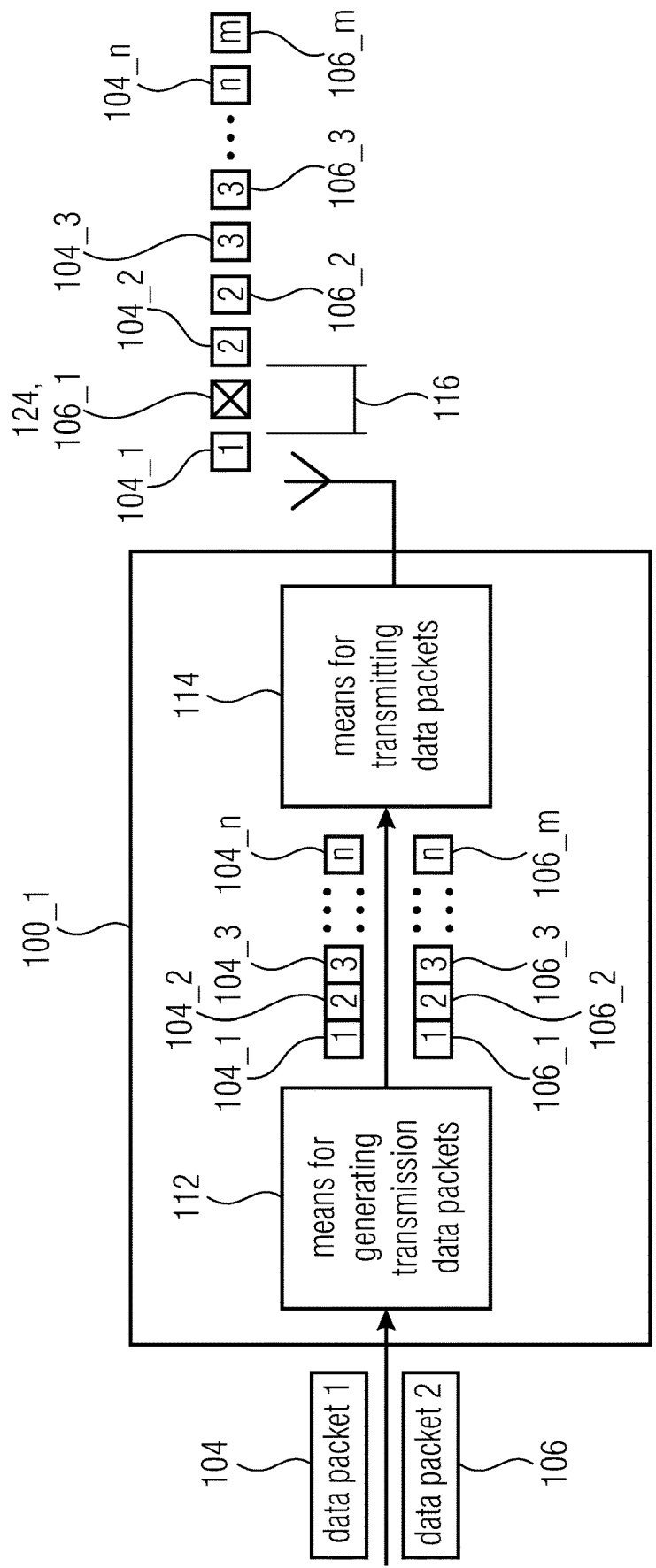
FIG. 4 is a schematic view of a data transmitter in accordance with an embodiment.

Telegram Splitting in the Transmit Path, Simultaneously Emitting Several Telegrams FIG. 4 shows an exemplary view of a data transmitter 100_1 in accordance with an embodiment. The transmitter 100_1 comprises means 112 for generating transmission data packets, configured to split a first data packet 104 destined for the first data receiver 102_1 into at least two transmission data packets 104_1 to 104_n (wherein n may be any natural number greater than or equaling two), wherein each of the transmission data packets 104_1 to 104_n destined for the first data receiver 102_1 is shorter than the first data packet 104. Additionally, the data transmitter 100_1 comprises means 114 for transmitting data packets, configured to transmit the at least two transmission data packets 104_1 to 104_n destined for the first data receiver 102_1 via a communications channel with a time gap 116. The means 114 for transmitting data packets here is configured to transmit at least one further transmission data packet 124 to the first data receiver 102_1 or the second data receiver 102_2 in the time gap 116 between the at least two transmission data packets 104_1 to 104_n destined for the first data receiver 102_1.

In embodiments, the data transmitter 101 may thus make use of the time gap (like interval, pause) 116 between two transmission data packets 104_1 to 104_n or between emitting two transmission data packets 104_1 to 104_n in order to emit (at least) one further transmission data packet 124, thereby improving channel occupation or channel utilization.

The further transmission data packet 124 here can be any data packet which can be transmitted using any transmission method.

It is of course also possible for the further transmission data packet 124 to be one of at least two transmission data packets by means of which the data transmitter 100_1 transmits the second data packet 106 to the first data receiver 102_1 or the second data receiver 102_2 via the communications channel in a split manner.

Exemplarily, the means 112 for generating transmission data packets may be configured to split up the second data packet 106 destined for the second data receiver 102_2 into at least two transmission data packets 106_1 to 106_m (wherein m may be any natural number greater than or equaling two), wherein each of the at least two transmission data packets 106_1 to 106_m for the second data receiver 102_2 is shorter than the second data packet 106. The means 114 for transmitting data packets may be configured to transmit the at least two transmission data packets 106_1 to 106_m via the communications channel with a time gap. In this case, one of the at least two transmission data packets 106_1 to 106_m of the second data packet 106 may be the further transmission data packet.

As is indicated in FIG. 4, the means 114 for transmitting data packets may be configured to transmit the at least two transmission data packets 104_1 to 104_n destined for the first data receiver 102_1 and the at least two transmission data packets 106_1 to 106_m destined for the second data receiver 102_2 alternatingly in the time gap between the transmission data packets destined for the respective other data receiver.

The mode of functioning of the data transmitter 100_1 as shown in FIG. 4 will be discussed below in greater detail referring to FIGS. 5 and 6.

Figure 5:
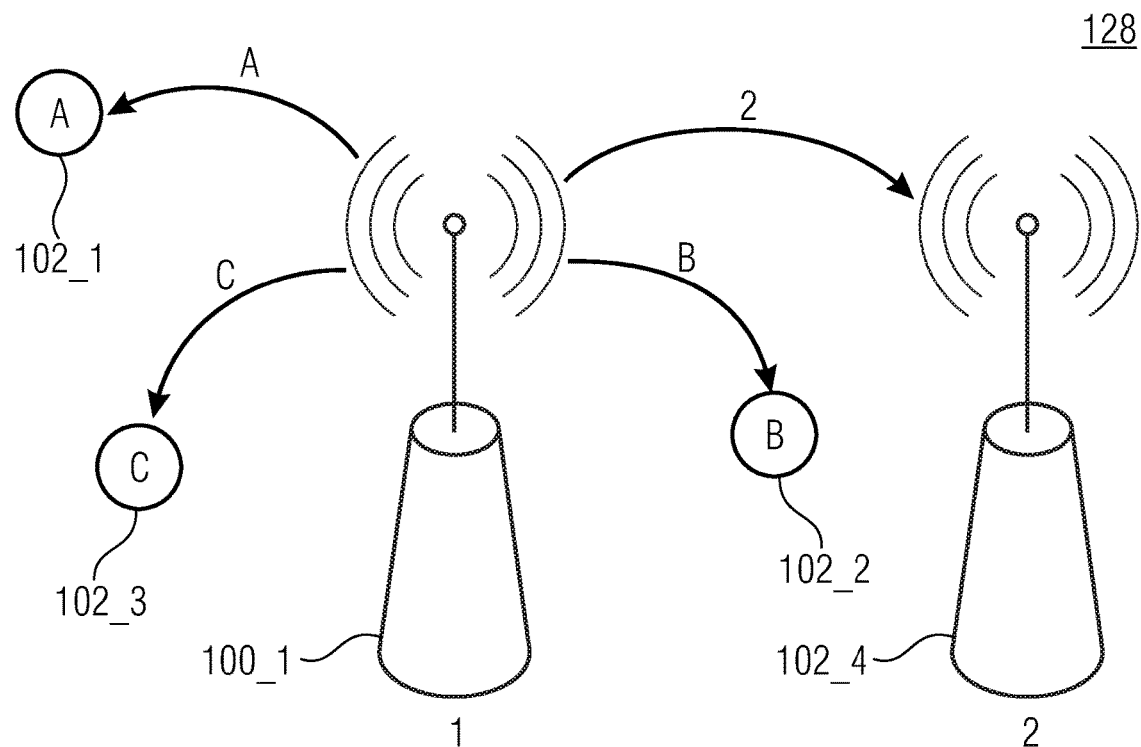
FIG. 5 is a schematic view of a system comprising the data transmitter as shown in FIG. 4 and several data receivers in accordance with an embodiment.

FIG. 5 shows a schematic view of a system 128 having the data transmitter 100_1 as shown in FIG. 4 and several data receivers 102_1 to 102_4 in accordance with an embodiment. In detail, FIG. 5 shows the first data receiver 102_1 and the second data receiver 102_2. The system 128 may further (optionally) comprise a third data receiver 102_3 and a fourth data receiver 102_4. As is exemplarily shown in FIG. 5, the data transmitter 100_1 and the fourth data receiver 102_4 may be base stations, whereas the first data receiver 102_1, the second data receiver 102_2 and the third data receiver 102_3 may be nodes (sensor nodes). Consequently, FIG. 5 shows the distribution of data packets (or telegrams) from one participant (data transmitter 100_1) to further participants (data receivers 102_1 to 102_4).

Figure 6:
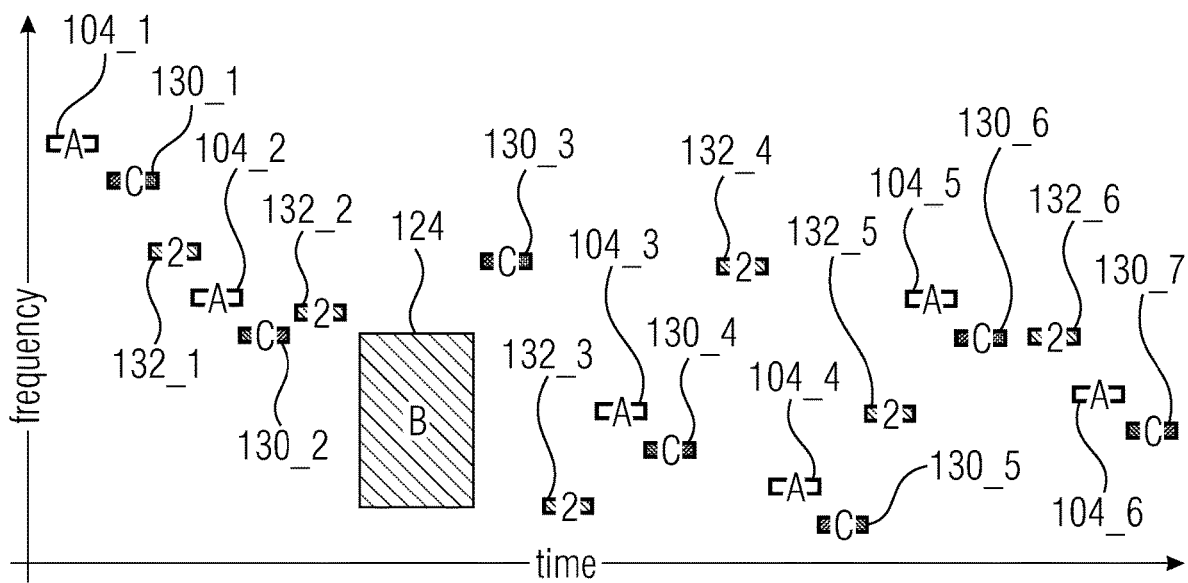
FIG. 6 shows an occupation of the communications channel for the system as shown in FIG. 5 in accordance with an embodiment in a diagram.

FIG. 6 shows an occupation of the communications channel (transmission medium) for the system 128 as shown in FIG. 5 in accordance with an embodiment in a diagram. Thus, in FIG. 6, the ordinate designates the frequency and the abscissa time.

As has already been described referring to FIG. 4 and can also be recognized from FIG. 6, the means 114 for transmitting data packets may be configured to transmit the at least two transmission data packets 104_1 to 104_n destined for the first data receiver 102_1 (in FIG. 6 also referred to by "A") via the communications channel with a time gap. The means 114 for transmitting data packets here may be configured to transmit the further transmission data packet 124 (in FIG. 6 referred to by "B") to the second data receiver 102_2 in the time gap 116 between the at least two transmission data packets 104_1 to 104_n destined for the first data receiver 102_1.

In the example shown in FIG. 6, the further transmission data packet 124 can be emitted to the second data receiver 102_2 by means of a different transmission method (that is not using the telegram splitting method).

The means 112 for generating data packets may also be configured to split a third data packet destined for the third data receiver 122_3 into at least two transmission data packets 130_1 to 130_m (in FIG. 6 also referred to by "C") (wherein m may be any natural number greater than or equaling two), wherein each of the transmission data packets 130_1 to 130_m destined for the third data receiver 102_3 is shorter than the third data packet. The means 114 for transmitting data packets may be configured to transmit the at least two transmission data packets 130_1 to 130_m destined for the third data receiver 102_3 via the communications channel with a time gap.

In addition, the means 112 for generating data packets may be configured to split a fourth data packet destined for the fourth data receiver 102_4 into at least two transmission data packets 132_1 to 132_i (in FIG. 6 also referred to by "Z") (wherein i may be any natural number greater than or equaling two), wherein each of the transmission data packets 132_1 to 132_i destined for the fourth data receiver 102_4 is shorter than the fourth data packet. The means 114 for transmitting data packets here may be configured to transmit the at least two transmission data packets 132_1 to 132_i destined for the fourth data receiver 102_4 via the communications channel with a time gap.

As can be recognized in FIG. 6, the at least two transmission data packets 104_1 to 104_n destined for the first data receiver 102_1, the at least two transmission data packets 130_1 to 126_m destined for the third data receiver 102_3 and the at least two transmission data packets 132_1 to 132_i destined for the fourth data receiver 102_4 can be transmitted alternatingly in the time gaps between the transmission data packets destined for the respective other data receiver.

The data transmitter 100_1 can consequently utilize the telegram splitting method for communications with the first, third and fourth data receivers 102_1, 102_3 and 102_4 and a different transmission method for communications with the second data receiver 102_2. The telegram splitting method may of course also be used for communications with the second data receiver 102_2.

As is also indicated in FIG. 6, the means 108 for transmitting data packets may be configured to distribute the transmission packets over several (at least two) frequency channels (or transmission frequencies).

In other words, a participant (data transmitter) 100_1 is able to radio to several other participants (data receivers) 102_1 to 102_4 in a temporally overlapping manner. This can be done due to the comparatively long pauses in telegram splitting. Here, the participant (data transmitter) 100_1 transmits a further transmission to a further participant (data receiver) or at least one further transmission to the same participant in a pause between two sub-packets (transmission data packets). This transmission may also be performed by means of telegram splitting, but also using any other transmission technique. When using telegram splitting, different hop patterns or the same hop pattern, but temporally offset, may be used. It is also possible, but not necessary to send time-offset hop patterns at a frequency offset.

Due to the time hop pattern, emitting the entire telegram (data packet) takes a comparatively long time, since there are many pauses in order to increase the resistance to interferences. In the pauses, it is possible to emit the transmission to a further participant, as is shown in FIG. 6 using the example of transmitting several temporally overlapping telegrams. In detail, an occupation of the spectrum when simultaneously transmitting four messages (data packets) A, B, C and 2 can be gathered from FIG. 6. For the first, third and fourth messages A, C and 2, the telegram splitting method can be used. For the first and third messages A and C, the same sub-packet pattern, but shifted in time and frequency, can be used. A different sub-packet pattern can be used for the fourth message 2. A different transmission technique can be used for the second message B.

Figure 7:
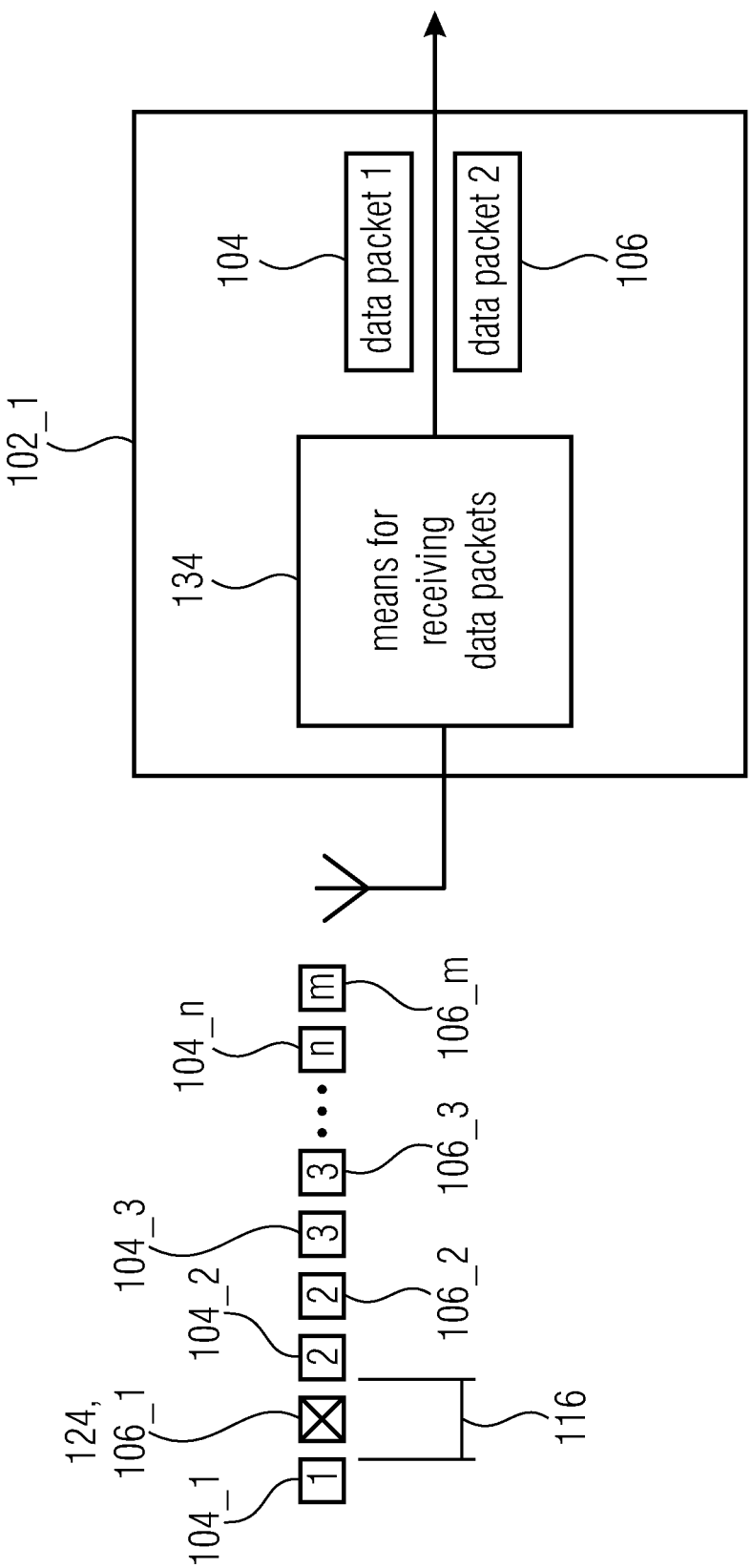
FIG. 7 is a schematic view of a data receiver in accordance with an embodiment.

Telegram Splitting in the Receive Path, Simultaneously Receiving Several Telegrams FIG. 7 shows a schematic view of the data receiver 102_1 in accordance with an embodiment. The data receiver 102_1 comprises means 134 for receiving data packets, configured to receive at least two transmission data packets 104_1 to 104_n (wherein n may be any natural number greater than or equaling two) from a first data transmitter 100_1, which are transmitted via a communications channel with a time gap 116 and each contain part of a first data packet 104, wherein the means 134 for receiving data packets is configured to combine the at least two transmission data packets 104_1 to 104_n in order to obtain the first data packet 104. The means 134 for receiving data packets here is configured to receive at least one further data packet 124 from the first data transmitter 100_1 or the second data transmitter 100_2 in the time gap 116 between the at least two transmission data packets 104_1 to 104_n.

The further transmission data packet 124 here can be emitted by the first data transmitter 100_1 or the second data transmitter 100_2 by means of any transmission method (that is except for the telegram splitting method).

It is of course also possible for the further transmission data packet 124 to be one of at least two transmission data packets by means of which the first data transmitter 100_1 or the second data transmitter 100_2 transmits the second data packet 106 to the data receiver 102_1 via the communications channel in a split manner.

Exemplarily, the means 134 for receiving data packets may be configured to receive at least two transmission data packets 106_1 to 106_m from the second data transmitter 100_2 (wherein m may be any natural number greater than or equaling two), which are transmitted via a communications channel with a time gap and each contain part of the second data packet 106, wherein the means 134 for receiving data packets is configured to combine the at least two transmission data packets 106_1 to 106_m from the second data transmitter 100_2 in order to obtain the second data packet 106. In this case, one of the at least two transmission data packets 106_1 to 106_m may be the further transmission data packet 124.

As can exemplarily be recognized in FIG. 7, the means 134 for receiving data packets may be configured to receive the at least two transmission data packets 104_1 to 104_n from the first data transmitter 100_1 and receive the at least two transmission data packets 106_1 to 106_m from the second data transmitter 100_2 alternatingly in the time gap between the transmission data packets from the respective other data transmitter.

A participant (like data receiver 102_1) is thus able to receive from several other participants (like data transmitters 100_1 to 100_2) in a temporally overlapping manner. This is made possible by the comparatively long pauses in telegram splitting. Here, the participant receives a further transmission from a further participant or at least one further message from the same participant in a pause between two sub-packets. This transmission may also take place by means of telegram splitting, but also using any other transmission technique. When using telegram splitting, different sub-packet patterns or the same sub-packet pattern, but offset in time, may be used. It is additionally possible, but not necessary to send the time-offset sub-packet pattern at a frequency offset.

Due to the hop pattern/time hop pattern, emitting the entire telegram (like first data packets 104 or second data packets 106) takes a comparatively long period of time, since there are many pauses in order to increase resistance to interferences. Within the pauses, it is possible to receive also the transmission from a further participant, as will be discussed below referring to the example, shown in FIG. 8, of a system having several temporally overlapping telegrams.

Figure 8:
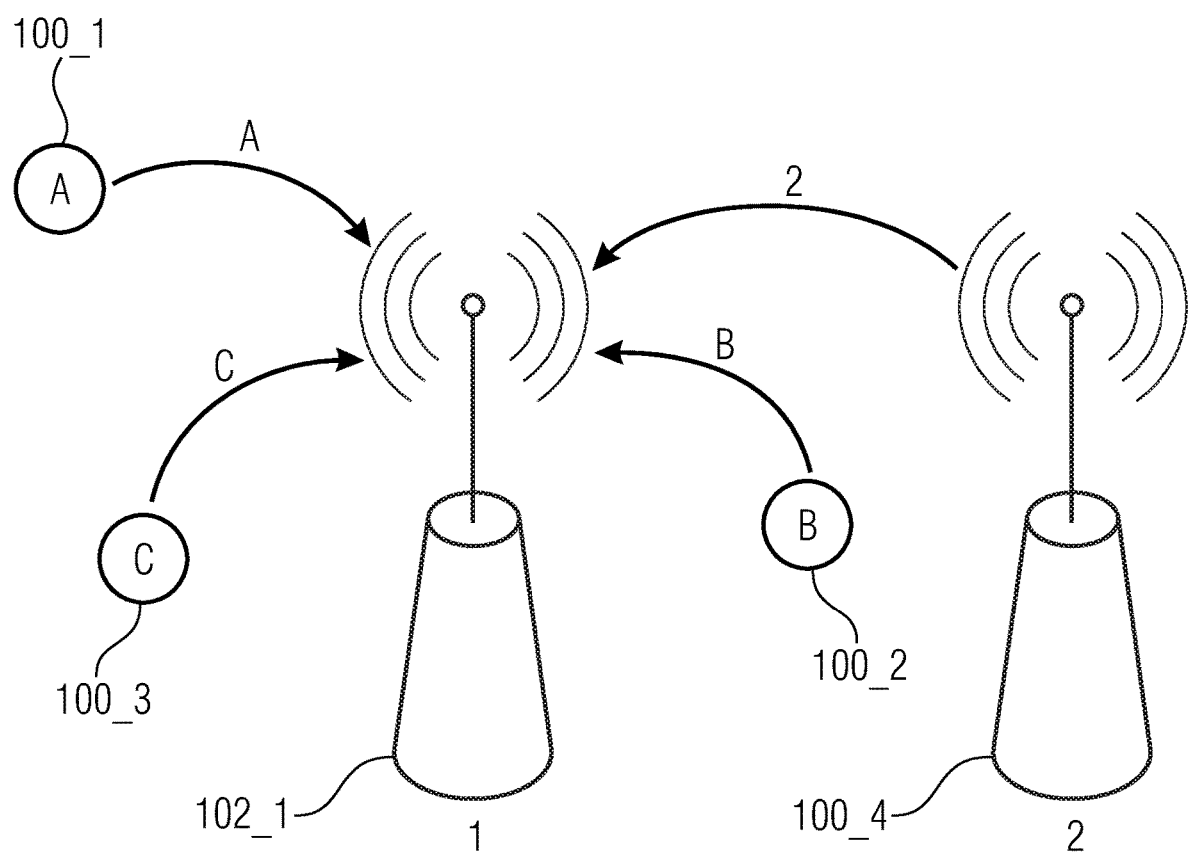
FIG. 8 is a schematic view of a system having the data receiver as shown in FIG. 7 and several data transmitters in accordance with an embodiment.

FIG. 8 shows a schematic view of a system 128 having the data receiver 102_1 as shown in FIG. 1 and several data transmitters 100_1 to 100_4 in accordance with an embodiment. In detail, in FIG. 8, four data transmitters 100_1 to 100_4 can be recognized, wherein the data receiver 102_1 receives a first data packet "A" from a first data transmitter 101, a second data packet "B" from a second data transmitter 100_2, a third data packet "C" from the third data transmitter 100_3 and a fourth data packet "2" from the fourth data transmitter 100_4.

The data receiver 102_1 may be a base station. The first data transmitter 100_1, the second data transmitter 100_2 and the third data transmitter 100_3 may be nodes (sensor nodes), whereas the fourth data transmitter 100_4 may be a base station.

In case several telegrams (like data packets) overlap in the time and/or frequency ranges, the data interfered in can be corrected in many cases using error correction. Using methods like SIC (successive interference cancellation), is also possible. When the receive station comprises several receive antennas, beamforming or beamforming algorithms may be used additionally.

Figure 9:
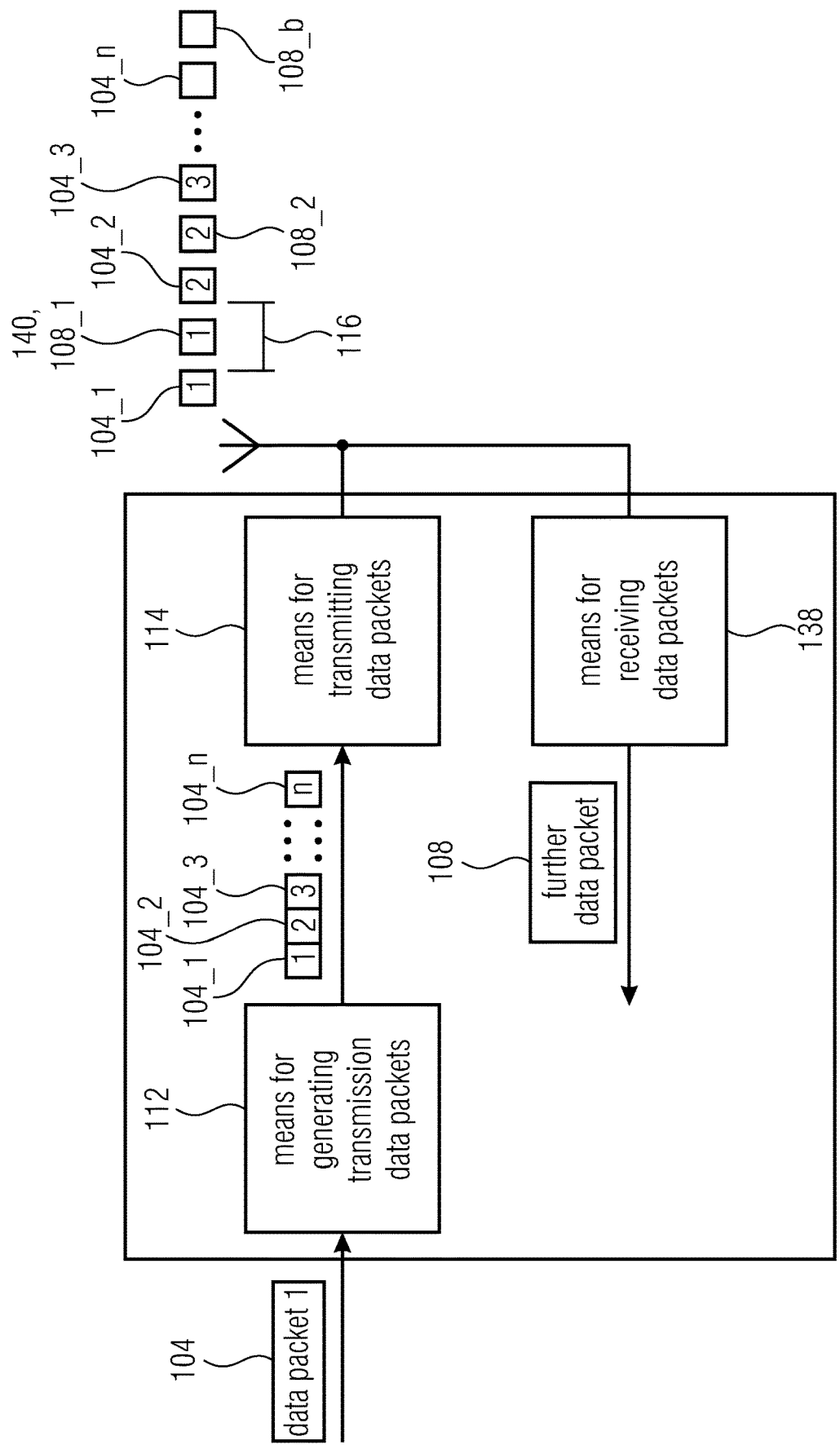
FIG. 9 is a schematic view of the data transmitter as shown in FIG. 4 having additional means for receiving data packets in accordance with an embodiment.

Telegram Splitting in Mixed Transmit and Receive Operation, Mixed Transmitting and Receiving with Temporally Overlapping Telegrams FIG. 9 shows a schematic view of the data transmitter 100_1 shown in FIG. 4 having additional means 138 for receiving data packets in accordance with an embodiment. The following description applies in analogy for the data transmitter 100_1 as shown in FIG. 2 as well. As regards the transmit path of the data transmitter 100_1, the above explanations are made reference to.

The data transmitter 100_1 may be a data transceiver further comprising means 138 for receiving data packets. The means 138 for receiving data packets may be configured to receive a transmission data packet 140 from a further data transmitter 100_2 in the time gap 116 between the transmission data packets 104_1 to 104_$n$ destined for the first data receiver 102_1.

The transmission data packet 140 from the further data transmitter 100_2 here may be transferred by means of any transmission method. The transmission data packet 140 may of course also be one of at least two transmission data packets by means of which the further data transmitter 100_2 transmits a further data packet 108 to the data transceiver 100_1 in a split manner.

Exemplarily, the means 138 for receiving data packets may be configured to receive at least one of at least two transmission data packets 108_1 to 108_$b$ (wherein b is a natural number greater than or equaling two), which are transmitted by the further data transmitter 100_2 in a time gap between the transmission data packets 104_1 to 104_$n$ destined for the first data receiver 102_1, wherein the at least two transmission data packets 108_1 to 108_$b$ are transmitted by the further data transmitter 102 via the communications channel with a time gap and each contain part of the further data packet 108, wherein the means 138 for receiving data packets is configured to combine the at least two transmission data packets 108_1 to 108_$b$ in order to obtain the further data packet 108. In this case, one of the at least two transmission data packets 108_1 to 108_$b$ from the further data transmitter 102 may be the transmission data packet 140 from the further data transmitter 100_2.

A participant (like transceiver 100_1) may correspondingly receive from several further participants in a temporally overlapping manner and/or transmit to several further participants in a temporally overlapping manner. This is possible due to the comparably long pauses in telegram splitting. Here, the pause between the sub-packets of one transmission of the participants may, irrespective of its direction, be used in order to perform a further transmission, also irrespective of its direction.

Basically, it is also possible for the receive station to support full-duplex operation and thus to be able to transmit and receive at the same time at the same frequency. This additional transmission may also be performed by means of telegram splitting, but also using any other transmission technique.

When using telegram splitting, different sub-packet patterns or the same sub-packet pattern, but offset in time, may be used. It is also possible, but not necessary to send the time-offset sub-packet patterns at a frequency offset.

Mixed transmitting and receiving with several participants will be described below in greater detail referring to FIG. 10.

Figure 10:
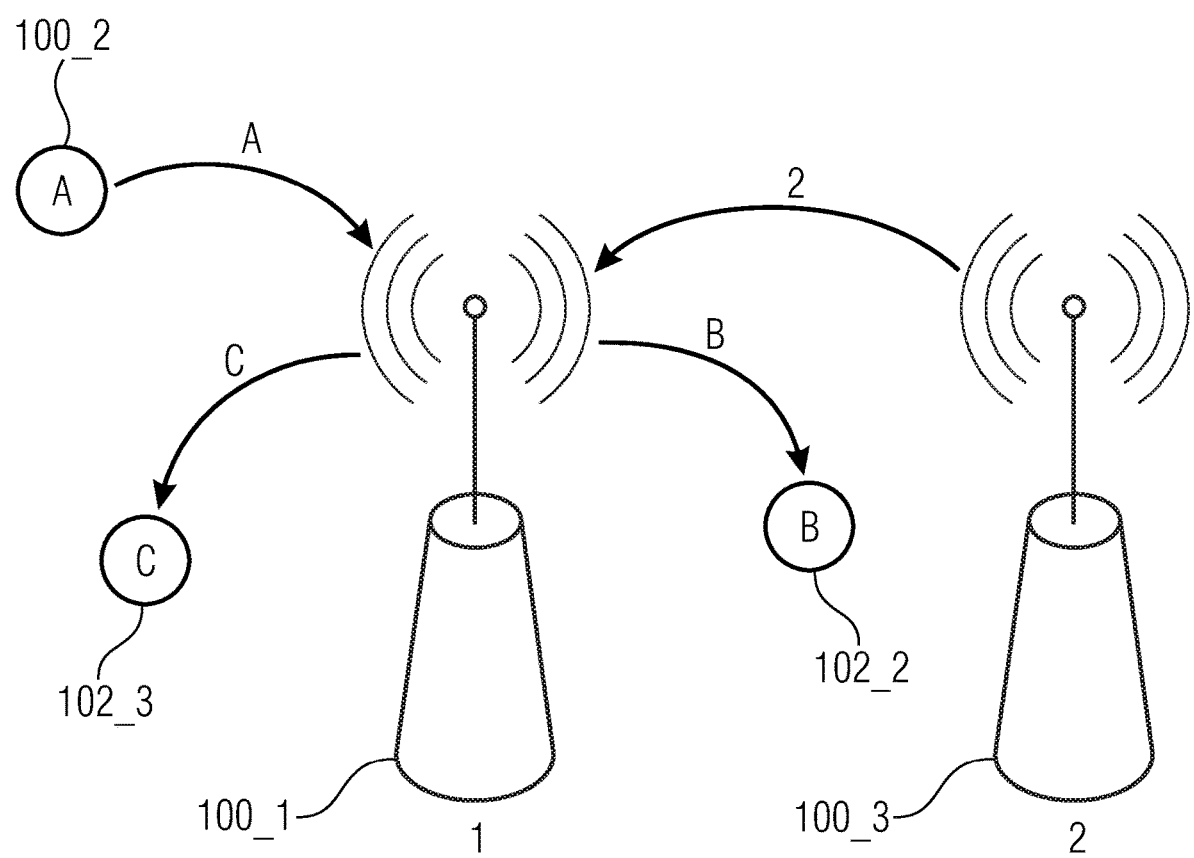
FIG. 10 is a schematic view of a system having the transceiver as shown in FIG. 9 and two data transmitters and two data receivers in accordance with an embodiment.

FIG. 10 shows a schematic view of a system 128 having the transceiver 100_1 as shown in FIG. 9 and two data transmitters 100_2 and 10_3 and two data receivers 102_2 and 102_3 in accordance with an embodiment. The data transceiver 100_1 can receive a first data packet "A" from the second data transmitter 100_2, transmit a second data packet "B" to the second data receiver 102_2, transmit a third data packet "C" to the third data receiver 102_3 and receive a fourth data packet "2" from the third data transmitter 100.

The transceiver 100_1 may be a base station. The second data transmitter 100_2, the second data receiver 102_2, the third data receiver 102_3 may be sensor nodes, whereas the third data transmitter 100_3 may be a base station.

In other words, FIG. 10 shows an exemplary mixed transmitting and receiving of temporally overlapping telegrams. In detail, base station 1 (100_1) can transmit to sensor node B (102_2) and sensor node C (102_3), whereas at the same time messages are received from base station 2 (100_3) and sensor node A (100_2).

The base station 100_1 consequently wishes to transmit to two sensor nodes 102_2 and 102_3, while it receives a message from a further sensor node 100_2 and a base station 100_3.

Due to the hop pattern/time hop pattern, emitting the entire telegram takes a relatively long period of time, since there are many pauses in order to increase the resistance to interferences. Within the pauses, it is possible to perform a further transmission, see the example of transmitting several temporally overlapping telegrams in FIG. 6.

Duplex operation (transmitting and receiving between participants) will be described below in greater detail referring to FIGS. 11 and 12.

Figure 11:
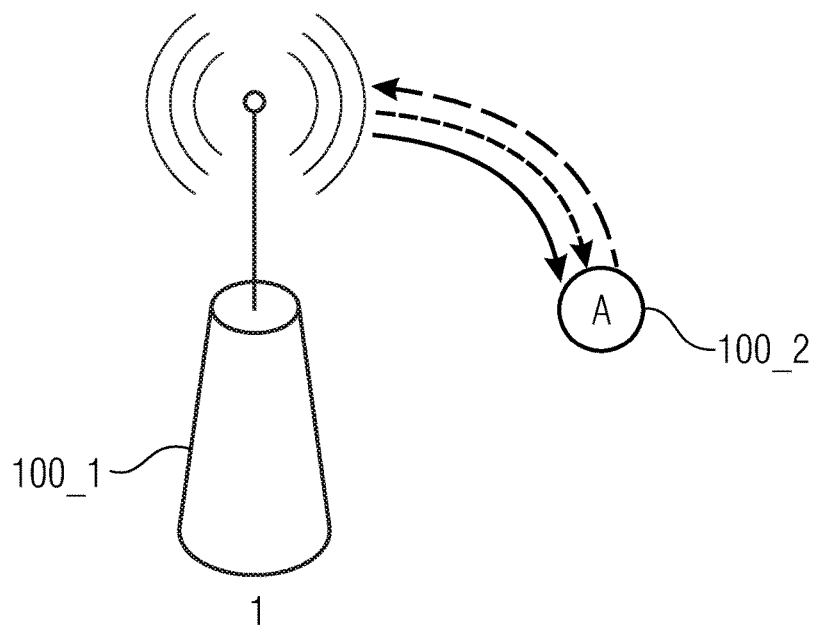
FIG. 11 is a schematic view of a system having two transceivers in accordance with an embodiment.

FIG. 11 shows a schematic view of a system 128 having two transceivers 100_1 and 100_2 in accordance with an embodiment. FIG. 11 reveals an exemplary duplex operation between two participants. In duplex operation, a participant transmits and receives with the same further participant in a temporally overlapping manner. This transmission is not restricted to telegram splitting or one message per direction.

As is also exemplarily indicated in FIG. 11, the first transceiver 100_1 may be a base station, whereas the second transceiver 100_2 may be a sensor node. Exemplarily, the base station 100_1 may transmit two messages (data packets) to the sensor node 100_2, whereas the sensor node transmits a message (data packet) to the base station 100_1.

Figure 12:
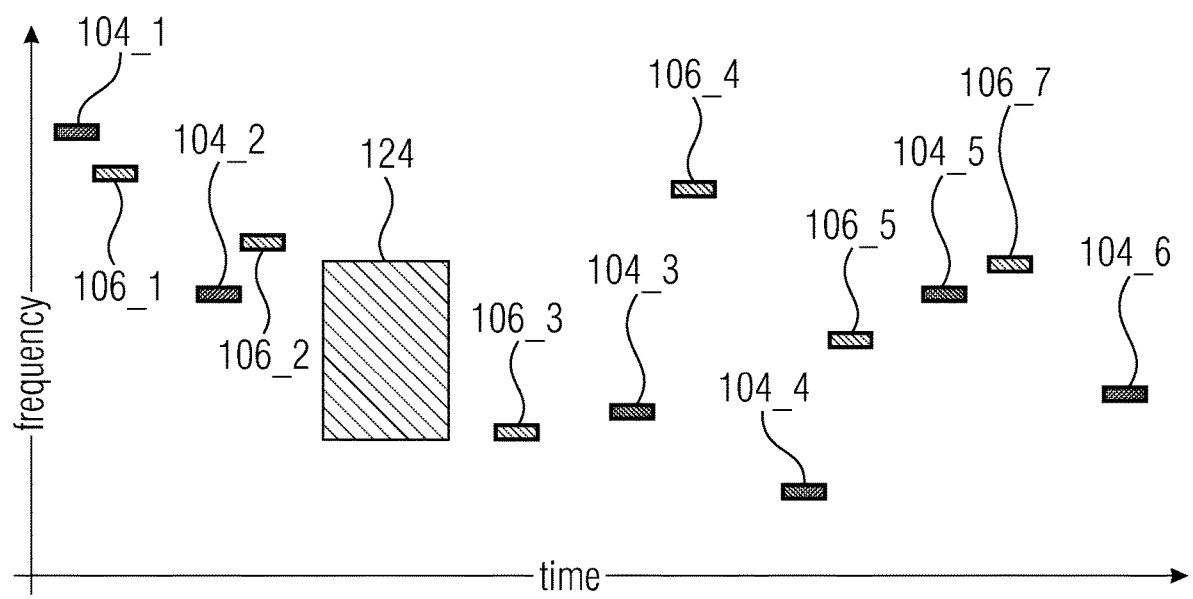
FIG. 12 shows an occupation of the communications channel for the system as shown in FIG. 11 in accordance with an embodiment in a diagram.

FIG. 12 shows an occupation of the communications channel (transmission medium) for the system 128 as shown in FIG. 11 in accordance with an embodiment in a diagram. The ordinate describes frequency, whereas the abscissa describes time.

As can be recognized from FIG. 12, the first transceiver 100_1 may be configured to transmit the first data packet 104 to the second transceiver 100_2 in a way split into the at least two transmission data packets 104_1 to 104_$n$ (telegram splitting). In addition, the first transceiver 100_1 may be configured to transmit the further transmission data packet 124 to the second transceiver 102 in the time gap between the at least two transmission data packets 104_2 and 104_3 (different transmission method).

The second transceiver 100_2 may be configured to transmit the second data packet 106 to the first data transceiver 100_1 in a manner split into the at least two transmission data packets 106_1 to 106_$m$ (telegram splitting).

The transmission data packets from the first transceiver and the transmission data packets from the second transceiver here may be emitted in the time gap between the respective other transmission data packets.

Figure 13:
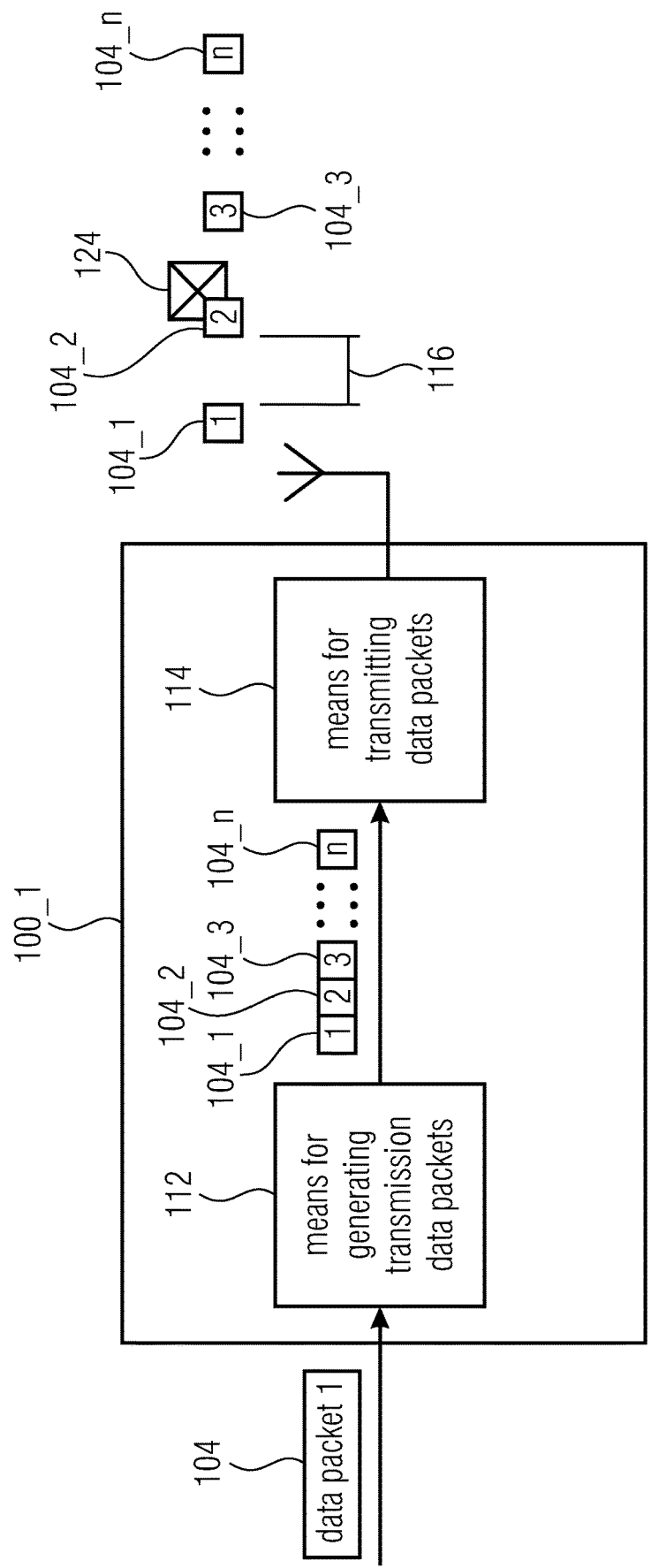
FIG. 13 is a schematic view of a data transmitter in accordance with an embodiment of the present invention.

Telegram Splitting in the Transmit Path, while Omitting Overlapping Transmission Data Packets when Transmitting to Several Participants FIG. 13 shows a schematic view of a data transmitter 100_1 in accordance with an embodiment of the present invention. The data transmitter 100_1 comprises means 112 for generating transmission data packets, configured to split the first data packet 104 into at least three transmission data packets 104_1 To 104_n (wherein n may be any natural number greater than or equaling three), wherein each of the at least three transmission data packets 104_1 to 104_n is shorter than the first data packet 104, wherein the means 112 for generating transmission data packets is configured to channel-encode the at least three transmission data packets 104_1 to 104_n such that only a portion of the transmission data packets (like only at least two of the at least three transmission data packets 104_1 to 104_n) is needed for decoding the first data packet 104. In addition, the data transmitter comprises means 114 for transmitting data packets, configured to transmit the at least three transmission data packets 104_1 to 104_n via a communications channel with a time gap 116. The means 114 for transmitting data packets here may be configured not to transmit, transmit only partly or at a later time a transmission data packet, waiting for transmission, of the at least three transmission data packets if there is a further transmission packet 124 waiting for transmission at the time of transmitting the one transmission data packet.

In embodiments, the data transmitter can, for example when a further transmission data packet is waiting for transmission at the time of transmitting the one transmission data packet, not transmit, transmit only partly or at a later time via the communications channel the transmission data packet, waiting for transmission, of the at least three transmission data packets. Due to the channel encoding used using which the transmission data packets are channel-encoded, it is even possible not to emit or emit only partly one (or several) of the transmission data packets, without a data loss or information loss resulting, since only a portion, that is not all of the transmission data packets are needed for decoding the first data packet.

As can exemplarily be recognized in FIG. 13, the further transmission data packet 124 may be waiting for transmission at the time of the second transmission data packet 104_2. In this case, the means 114 for transmitting data packets may not transmit, transmit only partly or at a later time the second transmission data packet.

In embodiments, the means 114 for transmitting data packets may be configured to transmit the further transmission data packet 124 via the communications channel. In other words, the data transmitter 101 itself is able to transmit the further transmission data packet 124.

The further transmission data packet 124 can be transferred by means of any transmission method. It is of course also possible for the further transmission data packet 124 to be one of at least three transmission data packets 106_1 to 106_m by means of which the second data packet 106 is transmitted in a split manner.

Exemplarily, the at least three transmission data packets 104_1 to 104_n may be destined for a first data receiver 102_1. The means 112 for generating transmission data packets here may be configured to split a second data packet 106 destined for a second data receiver 102_2 into at least three transmission data packets 106_1 to 106_m (wherein m may be any natural number greater than or equaling three), wherein each of the transmission data packets 106_1 to 106_m destined for the second data receiver 102_2 is shorter than the second data packet 106, wherein the means 112 for generating data packets may be configured to channel-encode the at least three transmission data packets 106_1 to 106_m destined for the second data receiver 102_2 such that only a portion of the transmission data packets is needed for decoding the second data packet 106. The means 114 for transmitting data packets may be configured to transmit the at least three transmission data packets 106_1 to 106_m destined for the second data receiver 102_2 via the communications channel with a time gap. In this case, one of the at least three transmission data packets destined for the second data receiver 102_2 may be the further transmission data packet 124.

In embodiments, the further transmission data packet 124 may also be transmitted by any other data transmitter 100_2. The time of transmitting the further transmission data packet 124 by the further data transmitter 100_2 may be known to the data transmitter 100_1.

FIG. 14a shows an occupation of the communications channel (transmission medium) with the (planned) transmission data packets waiting for transmission in a diagram, whereas FIG. 14b shows an occupation of the communications channel with the actually emitted transmission data packets in a diagram. Both in FIG. 14a and FIG. 14b, the ordinate describes frequency, whereas the abscissa describes time.

As can be recognized from FIG. 14a, the first data packet 104 may be transmitted in a way split into the transmission data packets 104_1 to 104_n, the second data packet 106 in a way split into the transmission data packets 106_1 to 106_m and the third data packet in a way split into the transmission data packets 130_1 to 130_i with a respective time gap in the time gaps between the respective other transmission data packets.

As can also be recognized from FIG. 14a, a planned emission of the transmission data packets would result in two overlap regions 142 and 144. In a first overlap region, the transmission data packets 104_3 and 106_3 overlap, whereas the transmission data packets 104_4, 106_4 and 130_4 overlap in the second overlap region, which is why the transmission data packets mentioned are not transmitted, as can be recognized from FIG. 14b.

This means that one participant is able to radio to several other participants in a temporally overlapping manner. The time hop patterns here for some transmission data packets overlap probably. The transmitter may know which sub-packets (transmission data packet) will overlap (see FIG. 14a). The overlapping sub-packets cannot be emitted (see FIG. 14b), since the receivers may detect the lack of the sub-packets and process this information—that is evaluate this sub-packet to be lacking information.

This procedure may be better than emitting one of the sub-packets to a certain receiver, since the further, at least one, participants which also expect a sub-packet at this point may not be able to determine that the sub-packet was not destined for them and consequently receive a sub-packet which contains information unusable for decoding its telegram. From the point of view of error protection decoding, false information is worse than no information at all.

In embodiments, the means 114 for transmitting data packets may be configured not to transmit, transmit only partly or at a later time the transmission data packet, waiting for transmission, of the at least three transmission data packets 104_1 to 104_n if the further transmission data packet additionally fulfills a transmission criterion.

Exemplarily, the transmission criterion may indicate that the further transmission data packet 124 exhibits a higher transmission priority than the transmission data packet, waiting for transmission, of the at least three transmission data packets 104_1 to 104_n.

Furthermore, the transmission criterion may indicate that the transmission data packet 104_1 to 104_n waiting for transmission and the further transmission data packet 124 are transmitted in the same frequency channel.

When two sub-packets overlap in the time range, but not the frequency range, usually both sub-packets can be transmitted and no omission is necessary. Even when signals overlap only in time, but not the frequency range, nevertheless only one signal may be transmitted, like when the transmitter, for technical reasons, is only able to emit one sub-packet at one time, even when these do not overlap in the frequency range.

A decision as to which sub-packets can be omitted may result from different parameters. For example, from channel attenuation to the receiver or the number of sub-packets omitted already.

Telegram Splitting in the Transmit Path, while Only Transmitting Overlapping Transmission Data Packets if this is of Advantage for Decoding Certain Participants As has already been mentioned, the means 114 for transmitting data packets may be configured not to transmit, transmit only partly or at a later time the transmission data package, waiting for transmission, of the at least three transmission data packets 104_1 to 104_n only if the further transmission data packets additionally fulfils a transmission criterion.

The transmission criterion may, for example, indicate that in the transmission of the further transmission data packet 124, decoding the first data packet 104 by a data receiver based on the further transmission data packets of the at least three transmission data packets 104_1 to 104_n is nevertheless possible with a probability of at least 90% (or 70% or 80% or 95%). A channel quality may, for example, be considered for determining the probability. In addition, when determining the probability, a number of transmission data packets, not emitted before, of the at least three transmission data packets 104_1 to 104_n may be considered.

FIG. 15a shows an occupation of the communications channel (transmission medium) with the (planned) transmission data packets waiting for transmission in a diagram, whereas FIG. 15b shows an occupation of the communications channel with the actually emitted transmission data packets in a diagram. In both FIGS. 15a and 15b, the ordinate describes frequency, whereas the abscissa describes time.

As can be recognized from FIG. 15a, the first data packet 104 can be transmitted with a time gap in the time gaps between the respective other transmission data packets, in a way split into the transmission data packets 104_1 to 104_n and the second data packet 106 in a way split into the transmission data packets 106_1 to 106_m.

As can further be recognized from FIG. 15a, the planned emission of the transmission data packets would result in an overlap region 142 where the transmission data packets 104_4 and 106_4 overlap. As can be recognized from FIG. 15b, the transmission data packet 104_4 is not transmitted.

This means that a participant is able to radio to several other participants in a temporally overlapping manner. The time hop patterns may overlap in time for some sub-packets with high probability. With overlapping sub-packets, a sub-packet will only be emitted if it is evaluated by the base station as being important for a participant and as being not very interfering for the further participant.

Evaluating the interference may, for example, be done using the channel quality between the participants in the past. In case the channel between two participants (like A and C) was very good, the probability of interfering with a participant (like C) by emitting to a different participant (like B) is very low. If the channel between two participants (like A and B) has been critical, an additional interference by emitting the sub-packet to the one participant (like C), in the case of overlapping, would further decrease the receive quality of the message to the further participant (like B). A further criterion for evaluating may be the number of sub-packets, omitted already, of a telegram.

Thus, as is shown in FIGS. 15a and 15b, a sub-packet having a low interference potential can be emitted nevertheless in the case of overlapping. As is shown in FIG. 15a, an emission to two participants (like C and B) which partly overlap in a sub-packet is planned (see FIG. 15a). Since the channel to one participant (like C) is evaluated as being less susceptible to interference, with overlapping, the sub-packet for the one participant (like C) may be omitted and the sub-packet for the further participant (like B) be emitted.

Telegram Splitting in the Transmit Path, while Omitting Transmission Data Packets in Dependence on External Factors As a modification of the data transmitter 100_1 shown in FIG. 3, the means for transmitting data packets of which is configured not to transmit, transmit only partly or a later time overlapping transmission data packets, the means for transmitting data packets may instead (or additionally) be configured not to transmit, transmit only partly or at a later time a transmission data packet, waiting for transmission, of the at least three transmission data packets in dependence on external factors.

The data transmitter (like base station) 100_1 may consequently not transmit, transmit only partly or at a later time certain transmission data packets if these are not to be transmitted due to external factors (like regulatory factors, like an overall duty cycle, or by a message of a primary network (like UMTS)).

Telegram Splitting in the Transmit or Receive Path, with a Hop Pattern Adjusted to the Channel The means 114 for transmitting data packets may be configured to adjust the time gap between the transmission data packets, the frequency channel or the frequency channels which the transmission data packets are distributed to, or non-emission of a transmission data packet in dependence on a quality or occupation of the communications channel. In other words, the means 114 for transmitting data packets may be configured to adjust the hop pattern used to a quality or occupation of the communications channel.

In addition, the data transmitter (or data transceiver) 100_1 may be configured to emit, while using a further transmission data packet, the transmission time of at least one of the transmission data packets or at least a time gap between two of the transmission data packets. In other words, the data transmitter 100_1 may be configured to communicate its own hop pattern to further data transmitters, like using a corresponding transmission data packet with information on the hop pattern.

It is also possible for the data transmitter to be configured to, using a further transmission data packet, predetermine for a further data transmitter a transmission time when the further data transmitter emits a transmission data packet, or a time gap between two transmission data packets emitted by the further data transmitter. In other words, a data transmitter (like a base station) may predetermine the hop pattern to be used for a further data transmitter.

Selecting the hop pattern to be used for emission may be selected as desired. In order to obtain optimum performance, the hop pattern may be selected such that it provides improved performance for the expected transmission channel for transmission than any randomly selected one. For determining an improved hop pattern, the participant may resort to information, collected by the same or communicated to it externally, on the present channel and from the past (like radio channel situation of the previous seconds, general channel situation in this environment, situation at the same time last week, etc.).

In connection with a way of communicating the hop pattern to be used to a further participant, channel estimation and pattern selection can be left to a participant alone.
Telegram Splitting for Simultaneously Transmitting and Receiving, while Omitting Transmission Data Packets (Sub-Packets) to be Emitted, which Collide with Transmission Data Packets (Receive Sub-Packets) Needed Emitting a sub-packet of a participant may overlap with receiving a sub-packet from a further participant. While emitting the further sub-packet, the receiver would be blind for receiving the sub-packet.

In order to nevertheless receive the sub-packet, emitting sub-packets is interrupted. A decision on interrupting may, for example, be decided on using information like channel attenuation to the receiver or the number of sub-packets not emitted so far.

Exemplarily, the uplink transmission may be evaluated to be important, like a higher-priority hop pattern. The base station may interrupt emitting the downlink message at corresponding receive times of the uplink of the sensor node and thus ensure receiving sensor node telegrams without significantly compromising its own downlink message.
Telegram Splitting in the Transmit or Receive Path, Wherein Prioritized Telegrams can be Favored when Transmitting and Receiving A participant may comprise a telegram to be transmitted or received of high priority. All the overlapping sub-packets of further telegrams, both in the transmit and the receive direction, can be neglected in favor of said prioritized telegram.

Emissions overlapping with receiving a sub-packet of the prioritized telegram can be interrupted. Emitting or receiving a sub-packet of a non-prioritized telegram can be interrupted in the case of overlapping and instead the sub-packet of the prioritized telegram can be transmitted.
Telegram Splitting in the Transmit Path, Adjusting the Transmission Power of the Telegram Splitting Method to Participant The means for receiving data packets of the data transceiver 100_1 may further be configured to receive a data packet from the first data receiver and to determine a receive power, wherein the data transceiver 100_1 may be configured to adjust a transmit power at which the transmission data packets are transmitted to the first data receiver, in dependence on the receive power determined.

A participant (like A) may thus measure the field strength which the telegrams arrive at from further participants. The transmit power of one's own telegram to further participants may then be adjusted.

In order to load the radio channel to a minimum extent only, it is possible to reduce the transmit power to a minimum. Thus, participants having been received at high power, will only be transmitted back to at a lower power, since the radio channel obviously is very good. When the power at which a further participant has been received decreases, back transmissions are performed at higher power. Additionally or alternatively, sub-packets may also be omitted since using error correction may not entail receiving all the sub-packets.

When a large number of participants receive at the same transmit power and simultaneous responding to several participants is done with a similar hop pattern, by correspondingly adjusting the transmit power to the individual participants, what can be achieved is that the participants are able to better differentiate between their telegrams and the telegrams emitted by others using the level. Thus, identifiability can be improved (or even maximized).

Exemplarily, a base station may transmit to several sensor nodes in a temporally overlapping manner, like to a first sensor node (A) and a second sensor node (B), wherein transmissions from the first sensor node (A) will arrive at lower field strength and transmissions from the second sensor node (B) at higher field strength. The base station may then transmit sub-packets to the first sensor node (A) at high power and sub-packets to the second sensor nodes (B) at low power. In the case of overlapping sub-packets, sub-packets can be emitted for the first sensor node (A). The second sensor node (B) is able to detect that a sub-packet was not destined for the second sensor node (b) when the field strength is higher than with further sub-packets.
Other Apart from point-to-point communications, broadcast (BC) or multicast (MC) transmission from one participant to several (=MC) or all (=BC) the participants may take place simultaneously. This is why there may be special BC/MC hop patterns which are equal for all the participants, and individual hop patterns for every participant. Depending on which telegrams are priority telegrams, when sub-packets overlap, individual sub-packet from either the BC/MC transmission or individual telegrams may be omitted.

Figure 16:
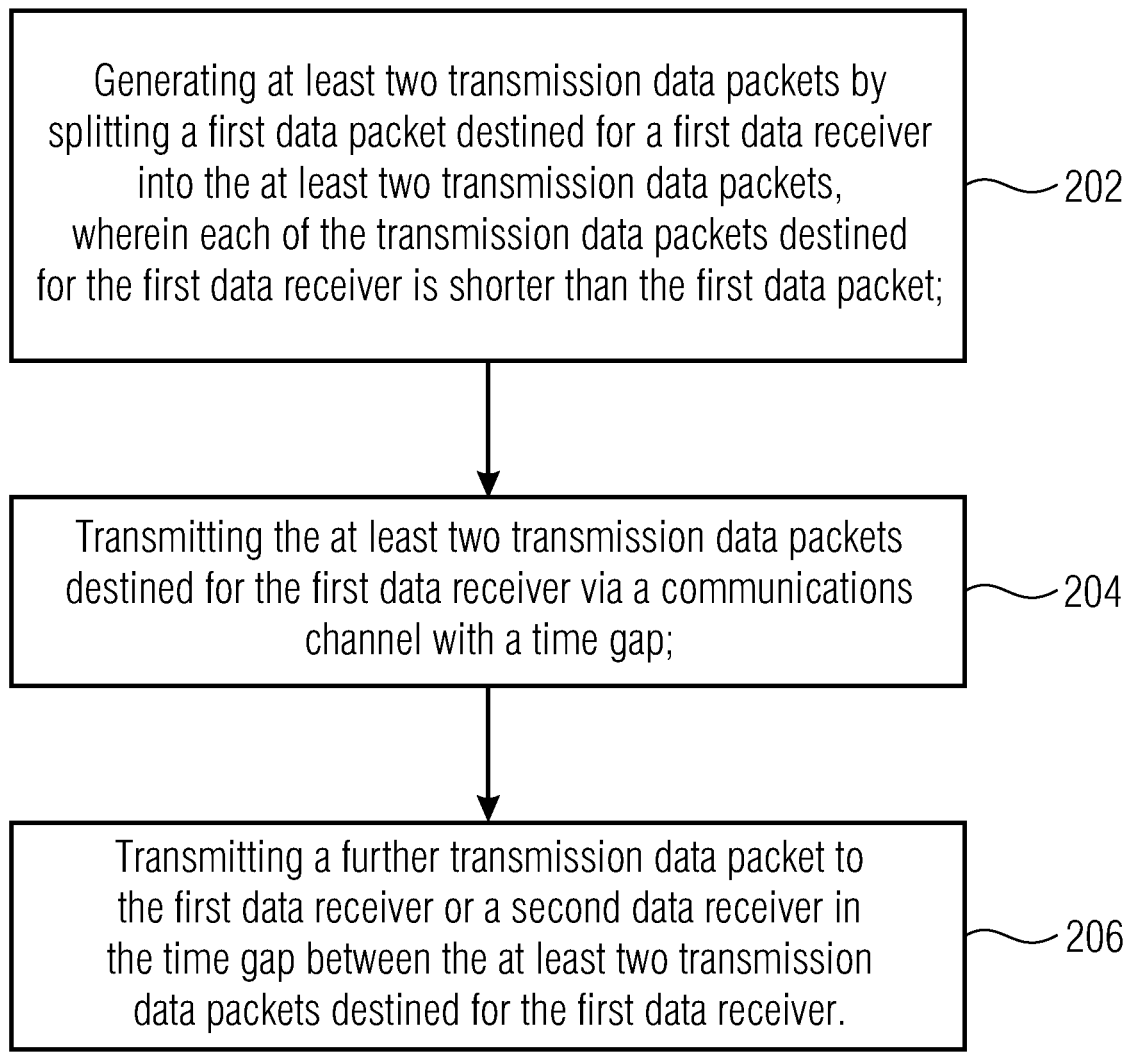
FIG. 16 shows a flowchart of a method for transmitting data packets in accordance with an embodiment.

FIG. 16 shows a flowchart of a method 200 for transmitting data packets in accordance with an embodiment. The method 200 comprises a step 202 of generating at least two transmission data packets by splitting a first data packet destined for a first data receiver into the at least two transmission data packets, wherein each of the transmission data packets destined for the first data receiver is shorter than the first data packet; a step 204 of transmitting the at least two transmission data packets destined for the first data receiver via a communications channel with a time gap; and a step 206 of transmitting a further transmission data packet to the first data receiver or a second data receiver in a time gap between the at least two transmission data packets destined for the first data receiver.

Figure 17:
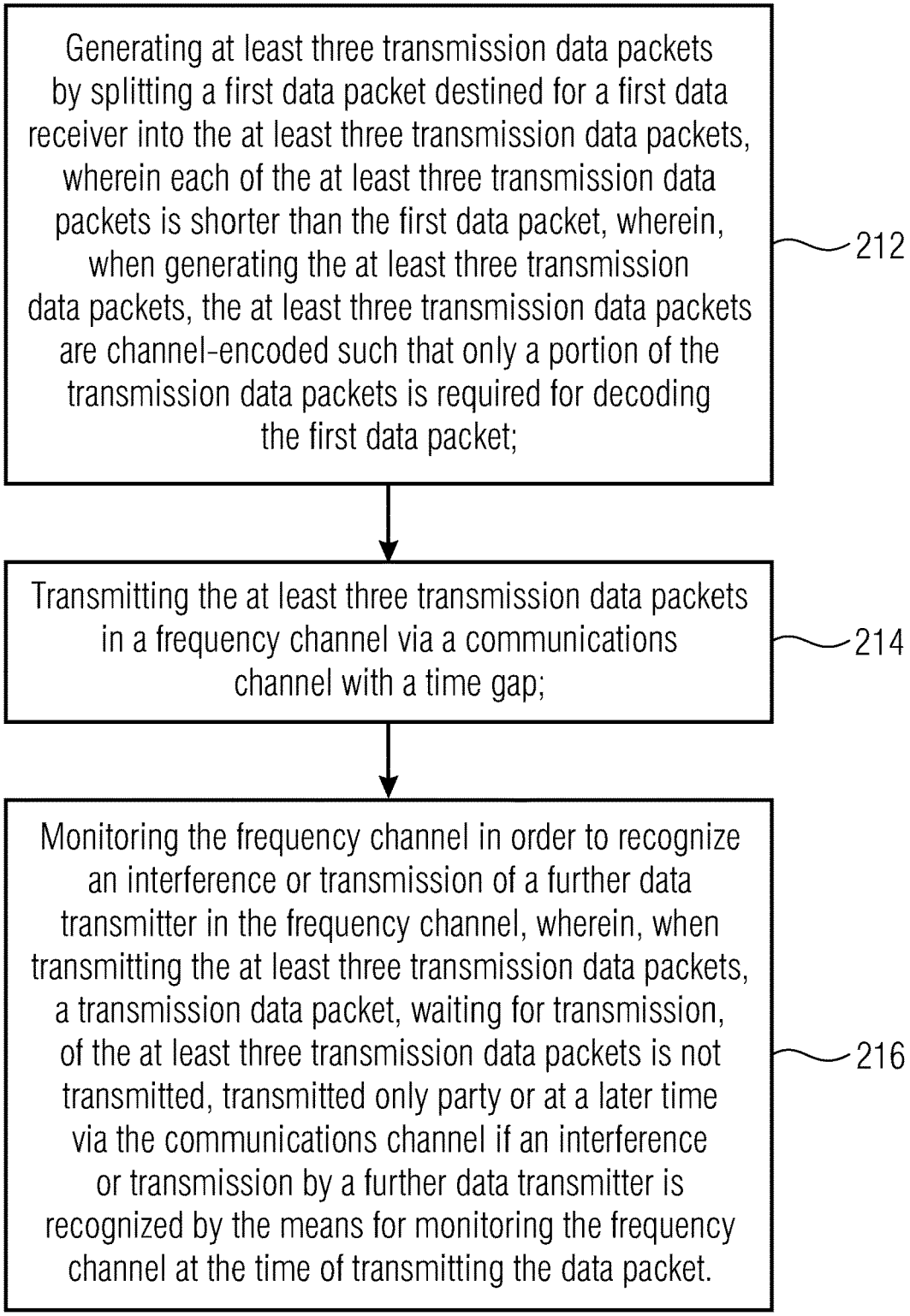
FIG. 17 shows a flowchart of a method for transmitting data packets in accordance with an embodiment.

FIG. 17 shows a flowchart of a method 210 for transmitting data packets in accordance with an embodiment. The method 210 comprises a step 212 of generating at least three transmission data packets by splitting a first data packet destined for a first data receiver into the at least three transmission data packets, wherein each of the at least three transmission data packets is shorter than the first data packet, wherein, when generating the at least three transmission data packets, the at least three transmission data packets are channel-encoded such that only a portion of the transmission data packets is needed for decoding the first data packet; a step 214 of transmitting the at least three transmission data packets in a frequency channel via a communications channel with a time gap; and a step 216 of monitoring the frequency channel in order to recognize an interference or transmission of a further data transmitter in the frequency channel; wherein, when transmitting the at least three transmission data packets, a transmission data packet, waiting for transmission, of the at least three transmission data packets is not transmitted, transmitted only partly or at a later time via the communications channel if an interference or transmission from a further data transmitter is recognized by the means for monitoring the frequency channel at the time of transmitting the data packet.

FIG. 18 shows a flowchart of a method 220 for transmitting data packets in accordance with an embodiment. The method 220 comprises a step 222 of generating at least three transmission data packets by splitting a first data packet destined for a first data receiver into the at least three transmission data packets, wherein each of the at least three transmission data packets is shorter than the first data packet, wherein, when generating the at least three transmission data packets, the at least three transmission data packets are channel-encoded such that only a portion of the transmission data packets is needed for decoding the first data packet; and a step 224 of transmitting the at least three transmission data packets in a frequency channel via a communications channel with a time gap; wherein, when transmitting the at least three transmission data packets, a transmission data packet, waiting for transmission, of the at least three transmission data packets is not transmitted, transmitted only partly or at a later time if a further transmission data packet is waiting for transmission at the time of transmitting the one transmission data packet.

Figure 19:
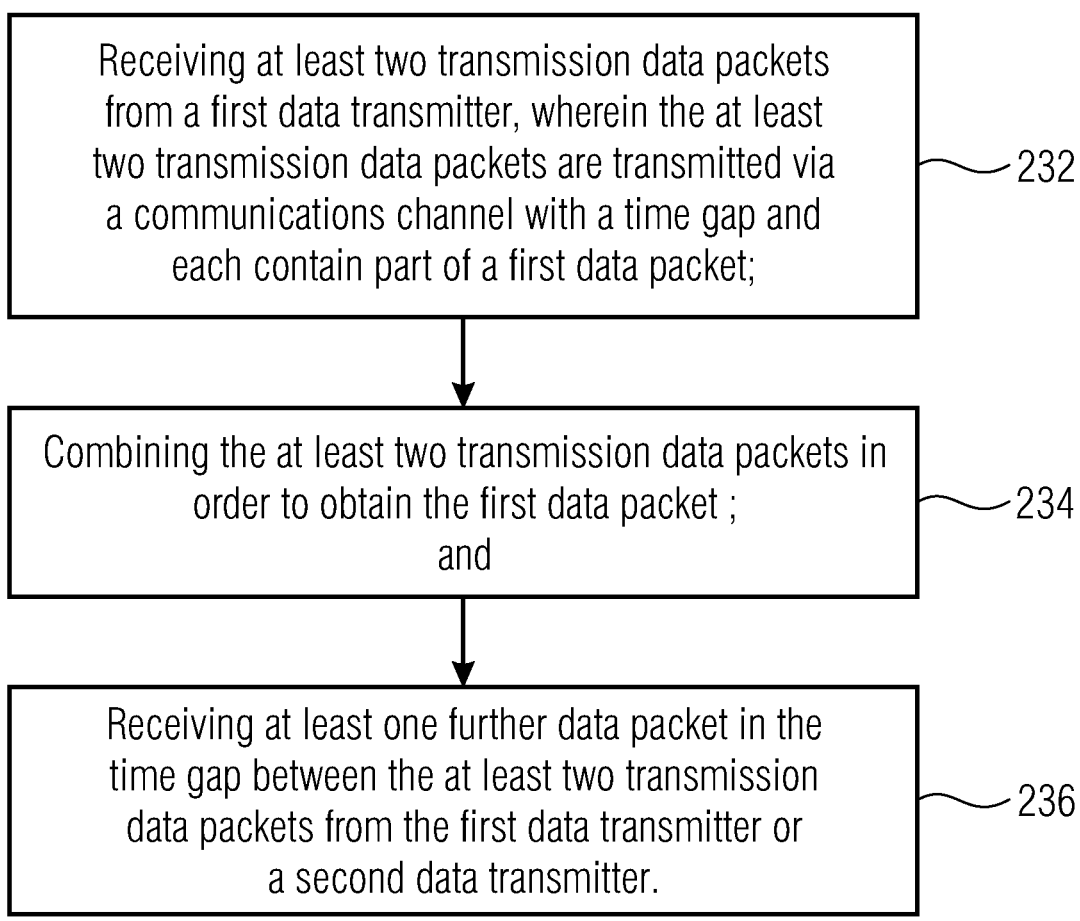
FIG. 19 shows a flowchart of a method for receiving data packets in accordance with an embodiment.

FIG. 19 shows a flowchart of a method 230 for receiving data packets in accordance with an embodiment. The method 230 comprises a step 232 of receiving at least two transmission data packets from a first data transmitter, wherein the at least two transmission data packets are transmitted via a communications channel with a time gap and each contain part of a first data packet; a step 234 of combining the at least two transmission data packets in order to obtain the first data packet; and a step 236 of receiving at least one further data packet in the time gap between the at least two transmission data packets from the first data transmitter or a second data transmitter.

In accordance with a first aspect, a data transmitter 100_1 comprises: means 112 for generating transmission data packets, configured to split a first data packet 104 destined for a first data receiver 102_1 into at least two transmission data packets 104_1-104_$n$, wherein each of the transmission data packets 104_1-104_$n$ destined for the first data receiver 102_1 is shorter than the first data packet 104; means 114 for transmitting data packets, configured to transmit the at least two transmission data packets 104_1-104_$n$ destined for the first data receiver 102_1 via a communications channel with a time gap 116; wherein the means 114 for transmitting data packets is configured to transmit at least one further transmission data packet 124 to the first data receiver 102_1 or a second data receiver 102_2 in the time gap 116 between the at least two transmission data packets 104_1-104_$n$ destined for the first data receiver 102_1.

In accordance with a second aspect when referring back to the first aspect, the means 112 for generating transmission data packets is configured to split a second data packet 106 destined for the second data receiver 102_2 into at least two transmission data packets 106_1-106_$n$, wherein each of the transmission data packets 106_1-106_$m$ destined for the second data receiver 102_2 is shorter than the second data packet 106; wherein the means 114 for transmitting data packets is configured to transmit the at least two transmission data packets 106_1-106_$m$ destined for the second data receiver 102_2 via the communications channel with a time gap; and wherein one of the at least two transmission data packets 106_1-106_$m$ destined for the second data receiver 102_2 is the further transmission data packet 124.

In accordance with a third aspect when referring back to the second aspect, the means 114 for transmitting data packets is configured to transmit the at least two transmission data packets 104_1-104_$n$ destined for the first data receiver 100_1 and the at least two transmission data packets 106_1-106_$m$ destined for the second data receiver 102_2 alternatingly in the time gap between the transmission data packets destined for the respective other data receiver.

In accordance with a fourth aspect when referring back to at least one of the first to third aspects, the at least two transmission data packets 104_1-104_$n$ are at least three transmission data packets 104_1-104_$n$, wherein the means 112 for generating transmission data packets is configured to channel-encode the at least three transmission data packets 104_1-104_$n$ such that only a portion of the transmission data packets 104_1-104_$n$ is needed for decoding the first data packet 104.

In accordance with a fifth aspect, a data transmitter 100_1 comprises: means 112 for generating transmission data packets, configured to split a first data packet 104 into at least three transmission data packets 104_1-104_$n$, wherein each of the at least three transmission data packets 104_1 to 104_$n$ is shorter than the first data packet 104, the means 112 for generating data packets being configured to channel-encode the at least three transmission data packets 104_1-104_$n$ such that only a portion of the transmission data packets 104_1-104_$n$ is needed for decoding the first data packet 104; means 114 for transmitting data packets, configured to transmit the at least three transmission data packets 104_1-104_$n$ in a frequency channel via a communications channel with a time gap 116; means 118 for monitoring the frequency channel, configured to recognize an interference 120 or transmission 122 of a further data transmitter 100_2 in the frequency channel; the means 114 for transmitting data packets being configured not to transmit, transmit only partly or at a later time a transmission data package, waiting for transmission, of the at least three transmission data packets 104_1-104_$n$ via the communications channel if an interference 120 or transmission 122 from a further data transmitter 100_2 is recognized by the means 118 for monitoring the frequency channel at the time of transmitting the transmission data packet.

In accordance with a sixth aspect when referring back to the fifth aspect, the means 118 for monitoring the frequency channel is configured to perform power detection in the frequency channel in order to recognize the interference 120 or transmission 122 of the further data transmitter 100_2 in the frequency channel.

In accordance with a seventh aspect when referring back to at least one of the fifth to sixth aspects, the means 118 for monitoring the frequency channel is configured to predict the interference 120 or transmission 122 of the further data transmitter 100_2 in the frequency channel based on a previous interference or previous transmission of a further data transmitter; or the means 118 for monitoring the frequency channel is configured to predict the interference 120 or transmission 122 of the further data transmitter 100_2 in the frequency channel based on an interference or transmission of a further data transmitter in a frequency channel adjacent to the frequency channel.

In accordance with an eighth aspect when referring back to at least one of the fifth to seventh aspects, the means 114 for transmitting data packets is configured to adjust the time gap 116 between the transmission data packets 104_1-104_$n$ in dependence on the interference 120 recognized or transmission 122 of the further data transmitter 100_2.

In accordance with a ninth aspect when referring back to at least one of the fifth to eight aspects, the means 114 for transmitting data packets is configured to transmit a further transmission data packet 124 to the first data receiver or a second data receiver in the time gap 116 between the at least two transmission data packets 104_1-104_n destined for the first data receiver 102_1.

In accordance with a tenth aspect, the data transmitter 100_1 comprises: means 112 for generating transmission data packets, configured to split a first data packet 104 into at least three transmission data packets 104_1-104_n, wherein each of the at least three transmission data packets 104_1-104_n is shorter than the first data packet 104, the means 112 for generating data packets being configured to channel-encode the at least three transmission data packets 104_1-104_n such that only a portion of the transmission data packets 104_1-104_n is needed for decoding the first data packet 104; means 114 for transmitting data packets, configured to transmit the at least three transmission data packets 104_1-104_n via a communications channel with a time gap 116; the means 114 for transmitting data packets being configured not to transmit, transmit only partly or at a later time a transmission data packet, waiting for transmission, of the at least three transmission data packets 104_1-104_n.

In accordance with an eleventh aspect when referring back to the tenth aspect, the means 114 for transmitting data packets is configured not to transmit, transmit only partly or at a later time a transmission data packet, waiting for transmission, of the at least three transmission data packets 104_1-104_n if a further transmission data packet 124 is waiting for transmission at the time of transmitting the one transmission data packet.

In accordance with a twelfth aspect when referring back to the eleventh aspect, the means 114 for transmitting data packets is configured to transmit the further transmission data packet 124 via the communications channel.

In accordance with a thirteenth aspect when referring back to at least one of the eleventh to twelfth aspects, the at least three transmission data packets 104_1-104_n are destined for a first data receiver 102_1; wherein the means 112 for generating transmission data packets is configured to split a second data packet 106 destined for a second data receiver 102_2 into at least three transmission data packets 106_1-106_m, wherein each of the transmission data packets 106_1-106_m destined for the second data receiver 102_2 is shorter than the second data packet 106; wherein the means 112 for generating data packets is configured to channel-encode the at least three transmission data packets 106_1-106_m destined for the second data receiver 102_2 such that only a portion of the transmission data packets is needed for decoding the second data packet 106; wherein the means 114 for transmitting data packets is configured to transmit the at least three transmission data packets 106_1-106_m destined for the second data receiver 102_2 via the communications channel with a time gap; and wherein one of the transmission data packets 106_1-106_m destined for the second data receiver 102_2 is the further transmission data packet.

In accordance with a fourteenth aspect when referring back to the eleventh aspect, the further transmission data packet 124 is transmitted by a further data transmitter 100_2.

In accordance with a fifteenth aspect when referring back to the fourteenth aspect, the data transmitter knows the time of transmitting the further transmission data packet 124 by the further data transmitter 100_2.

In accordance with a sixteenth aspect when referring back to at least one of the eleventh to fifteenth aspects, the means 114 for transmitting data packets is configured not to transmit, transmit only partly or at a later time a transmission data packet, waiting for transmission, of the at least three transmission data packets 104_1-104_n if there is a further transmission data packet 124 waiting for transmission at the time of transmitting the one transmission data packet and the further transmission data packet 124 fulfills a transmission criterion.

In accordance with a seventeenth aspect when referring back to the sixteenth aspect, the transmission criterion indicates that the further transmission data packet comprises higher a transmission priority than the transmission data packet, waiting for transmission, of the at least three transmission data packets 104_1-104_n.

In accordance with an eighteenth aspect when referring back to the sixteenth aspect, the transmission criterion indicates that in the transmission of the further transmission data packet 124, decoding the first data packet 104 by a data receiver 102_1, 102_2 based on the further transmission data packets of the at least three transmission data packets 104_1-104_n is nevertheless possible with a probability of at least 90%.

In accordance with a nineteenth aspect when referring back to the eighteenth aspect, a channel quality is considered when determining the probability.

In accordance with a twentieth aspect when referring back to at least one of the eighteenth to nineteenth aspects, when determining the probability, a number of transmission data packets, not emitted before, of the at least three transmission data packets 104_1-104_n is considered.

In accordance with a twenty-first aspect when referring back to the sixteenth aspect, the transmission criterion indicates that the transmission data packet waiting for transmission and the further transmission data packet 124 are transmitted in the same frequency channel.

In accordance with a twenty-second aspect when referring back to the fourteenth and sixteenth aspects, the data transmitter is a data transceiver, wherein the transmission criterion indicates that receiving the further transmission data packet 124 by the data transceiver 100_1 is needed.

In accordance with a twenty-third aspect when referring back to at least one of the tenth to twenty-second aspects, the means 114 for transmitting data packets is configured not to transmit, transmit only partly or at a later time a transmission data package, waiting for transmission, of the at least three transmission data packets 104_1-104_n in dependence on external factors.

In accordance with a twenty-fourth aspect when referring back to at least one of the first to twenty-third aspects, the means 114 for transmitting data packets is configured to transmit a first transmission data packet destined for the first data receiver 102_1 in a first frequency channel and to transmit a second transmission data packet destined for the second data receiver 102_2 in a second frequency channel.

In accordance with a twenty-fifth aspect when referring back to at least one of the first to twenty-fourth aspects, the means 114 for transmitting data packets is configured to distribute the transmission packets 104_1-104_n over at least two frequency channels.

In accordance with a twenty-sixth aspect when referring back to at least one of the first to twenty-fifth aspects, the data transmitter 100_1 is a data transceiver and further comprises: means 138 for receiving data packets, configured to receive a transmission data packet 140 from a further data transmitter 100_2 in the time gap 116 between the transmission data packets destined for the first data receiver 102_2.

In accordance with a twenty-seventh aspect when referring back to the twenty-sixth aspect, the means 138 for receiving data packets is configured to receive at least one of at least two transmission data packets 108_1-108b transmitted by the further data transmitter 100_2 in the time gap 116 between the transmission data packets 104_1-104_n destined for the first data receiver 102_1, wherein the at least two transmission data packets 108_1-108_b are transmitted by the further data transmitter 100_2 via the communications channel with a time gap and each contain part of a further data packet 108, wherein the means 138 for receiving data packets is configured to combine the at least two transmission data packets 108_1-108_b in order to obtain the further data packet 108; wherein one of the at least two transmission data packets 108_1-108_b from the further data transmitter 100_2 is the transmission data packet 140 from the further data transmitter.

In accordance with a twenty-eighth aspect when referring back to at least one of the first to twenty-seventh aspects, the data transmitter 100_1 is configured to emit the transmission time of at least one of the transmission data packets or at least a time gap between two of the transmission data packets using a further transmission data packet.

In accordance with a twenty-ninth aspect when referring back to at least one of the first to twenty-eighth aspects, the data transmitter 100_1 is configured to predetermine, using a further transmission data packet, to a further data transmitter a transmission time when the further data transmitter emits a transmission data packet, or a time gap between two of the transmission data packets emitted by the further data transmitter.

In accordance with a thirtieth aspect when referring back to at least one of the first to twenty-ninth aspects, the means 114 for transmitting data packets is configured to adjust the time gap between the transmission data packets or non-emitting a transmission data packet in dependence on a quality or occupation of the communications channel.

In accordance with a thirty-first aspect when referring back to at least one of the first to thirtieth aspects, the data transmitter is a data transceiver further comprising: means 138 for receiving data packets, configured to receive a data packet from the first data receiver 102_1 and to determine a receive power or receive quality; wherein the data transmitter 100_1 is configured to adjust a transmit power at which the transmission data packets 104_1-104_n are transmitted to the first data receiver 102_1, in dependence on the determined receive power or receive quality.

In accordance with a thirty-second aspect when referring back to at least one of the fifth to thirty-first aspects, the means 114 for transmitting data packets is configured to partly transmit, when a further transmission data packet 124 is waiting for transmission at the time of transmitting the one transmission data packet, the transmission data packet, waiting for transmission, of the at least three transmission data packets 104_1-104_n such that emitted parts of the one transmission data packet result in constructive superpositioning with the further transmission data packet 124.

In accordance with a thirty-third aspect, the data receiver 102_1 comprises: means 134 for receiving data packets, configured to receive at least two transmission data packets 104_1-104_n from a first data transmitter 100_1, which are transmitted via a communications channel with a time gap 116 and each contain part of a first data packet 104, the means 134 for receiving data packets being configured to combine the at least two transmission data packets 104_1-104_n in order to obtain the first data packet 104; the means 134 for receiving data packets being configured to receive at least one further data packet 124 from the first data transmitter 100_1 or a second data transmitter 100_2 in the time gap 116 between the at least two transmission data packets 104_1-104_n.

In accordance with a thirty-fourth aspect when referring back to the thirty-third aspect, the means 138 for receiving data packets is configured to receive at least two transmission data packets 106_1-106_m from a second data transmitter 100_2, which are transmitted via a communications channel with a time gap and each contain part of a second data packet 106, wherein the means 134 for receiving data packets is configured to combine the at least two transmission data packets 106_1-106_m in order to obtain the second data packet 106; wherein at least one of the at least two transmission data packets 106_1-106_m from the second data transmitter 100_2 is the at least one further transmission data packet 124.

In accordance with a thirty-fifth aspect when referring back to the thirty-fourth aspect, the means 134 for receiving data packets is configured to receive at least two transmission data packets 104_1-104_n from the first data transmitter 100_1 and the at least two data packets 106_1-106_m from the second data transmitter 100_2 alternatingly in the time gap between the transmission data packets from the respective other data transmitter.

In accordance with a thirty-sixth aspect when referring back to at least one of the thirty-third to thirty-fifth aspects, the at least two transmission data packets 104_1-104_n are at least three transmission data packets, wherein the at least three transmission data packets 104_1-104_n are channel-encoded such that only a portion of the at least three transmission data packets 104_1-104_n is needed for decoding; wherein the means 138 for receiving data packets is configured to receive, to combine and to decode at least two of the at least three transmission data packets 104_1-104_n in order to obtain the first data packet 104.

In accordance with a thirty-seventh aspect, a system 128 comprises: at least one data transmitter 100_1 in accordance with any of the first to thirty-first aspects; and at least one data receiver 102_1 in accordance with any of the third-second to thirty-fifth aspects.

In accordance with a thirty-eight aspect, a method comprises the steps of: generating at least two transmission data packets by splitting a first data packet destined for a first data receiver into the at least two transmission data packets, wherein each of the transmission data packets destined for the first data receiver is shorter than the first data packet; transmitting the at least two transmission data packets destined for the first data receiver via a communications channel with a time gap; transmitting a further transmission data packet to the first data receiver or a second data receiver in the time gap between the at least two transmission data packets destined for the first data receiver.

In accordance with a thirty-ninth aspect, a method comprises the steps of: generating at least three transmission data packets by splitting a first data packet destined for a first data receiver into the at least three transmission data packets, wherein each of the at least three transmission data packets is shorter than the first data packet, wherein, when generating the at least three transmission data packets, the at least three transmission data packets are channel-encoded such that only a portion of the transmission data packets is needed for decoding the first data packet; transmitting the at least three transmission data packets in a frequency channel via a communications channel with a time gap; monitoring the frequency channel in order to recognize an interference or transmission of a further data transmitter in the frequency channel, wherein, when transmitting the at least three transmission data packets, a transmission data packet, waiting for transmission, of the at least three transmission data packets is not transmitted, transmitted only party or at a later time via the communications channel if an interference or transmission from a further data transmitter is recognized by the means for monitoring the frequency channel at the time of transmitting the data packet.

In accordance with a fortieth aspect, a method comprises the steps of: generating at least three transmission data packets by splitting a first data packet destined for a first data receiver into the at least three transmission data packets, wherein each of the at least three transmission data packets is shorter than the first data packet, wherein, when generating the at least three transmission data packets, the at least three transmission data packets are channel-encoded such that only a portion of the transmission data packets is needed for decoding the first data packet; transmitting the at least three transmission data packets in a frequency channel via a communications channel with a time gap; wherein, when transmitting the at least three transmission data packets, a transmission data packet, waiting for transmission, of the at least three transmission data packets is not transmitted, transmitted only party or at a later time if a further transmission data packet is waiting for transmission at the time of transmitting the one transmission data packet.

In accordance with a forty-first aspect, a method comprises the steps of: receiving at least two transmission data packets from a first data transmitter, wherein the at least two transmission data packets are transmitted via a communications channel with a time gap and each contain part of a first data packet; combining the at least two transmission data packets in order to obtain the first data packet; and receiving at least one further data packet in the time gap between the at least two transmission data packets from the first data transmitter or a second data transmitter.

A forty-second aspect comprises a computer program for performing a method in accordance with any of the thirty-eighth to forty-first aspects.

Although some aspects have been described in the context of a device, it is clear that these aspects also represent a description of the corresponding method, such that a block or element of a device also corresponds to a respective method step or feature of a method step. Analogously, aspects described in the context with or as a method step also represent a description of a corresponding block or item or feature of a corresponding device. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention may be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium or the computer-readable medium are typically tangible and/or non-transitory and/or non-temporary.

A further embodiment of the inventive method is, therefore, a data stream or a sequence of signals representing the computer program for performing one of the methods described herein. The data stream or the sequence of signals may, for example, be configured to be transferred via a data communications connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

A further embodiment according to the invention comprises a device or a system configured to transfer a computer program for performing at least one of the methods described herein to a receiver. The transmission can be performed electronically or optically. The receiver may, for example, be a computer, a mobile device, a memory device or the like. The device or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods may be performed by any hardware device. This may be a universally applicable hardware, such as a computer processor (CPU), or hardware specific for the method, such as ASIC.

The devices described herein may exemplarily be implemented using a hardware apparatus or using a computer or using a combination of a hardware apparatus and a computer.

The devices described herein, or any components of the devices described herein, may be implemented at least partly in hardware and/or in software (computer program).

The methods described herein may exemplarily be implemented using a hardware apparatus or using a computer or using a combination of a hardware apparatus and a computer.

The methods described herein, or any component of the methods described herein, may be executed at least partly by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A data transmitter of a wireless sensor network, the data transmitter comprising:
    a generator for generating transmission data packets, configured to split a first data packet into at least three transmission data packets, wherein each of the at least three transmission data packets is shorter than the first data packet, the generator for generating data packets being configured to channel-encode the at least three transmission data packets such that only a portion of the transmission data packets is required for decoding the first data packet;
    a transmission element for transmitting data packets, configured to transmit the at least three transmission data packets in a frequency channel via a communications channel with a time gap;
    a monitor element for monitoring the frequency channel, configured to recognize an interference or transmission of a further data transmitter in the frequency channel;
    wherein the transmission element for transmitting data packets is configured not to transmit, transmit only partly or at a later time via the communications channel a transmission data packet, waiting for transmission, of the at least three transmission data packets if an interference or transmission from a further data transmitter is recognized by the monitor element for monitoring the frequency channel at the time of transmitting the transmission data packet,
    wherein the wireless sensor network comprises a base station and a plurality of sensor nodes,
    wherein the transmitter is the base station or one of the plurality of sensor nodes.

2. The data transmitter in accordance with claim 1, wherein the monitor element for monitoring the frequency channel is configured to perform power detection in the frequency channel in order to recognize the interference or transmission of the further data transmitter in the frequency channel.

3. The data transmitter in accordance with claim 1, wherein the monitor element for monitoring the frequency channel is configured to predict the interference or transmission of the further data transmitter in the frequency channel based on a previous interference or previous transmission of the further data transmitter;
    or wherein the monitor element for monitoring the frequency channel is configured to predict the interference or transmission of the further data transmitter in the frequency channel based on the interference or transmission of the further data transmitter in a frequency channel adjacent to the frequency channel.

4. The data transmitter in accordance with claim 1, wherein the transmission element for transmitting data packets is configured to adjust the time gap between the transmission data packets in dependence on the recognized interference or transmission of the further data transmitter.

5. The data transmitter in accordance with claim 1, wherein the transmission element for transmitting data packets is configured to transmit a first transmission data packet destined for the first data receiver in a first frequency channel and to transmit a second transmission data packet destined for the second data receiver in a second frequency channel.

6. The data transmitter in accordance with claim 1, wherein the transmission element for transmitting data packets is configured to distribute the transmission packets over at least two frequency channels.

7. The data transmitter in accordance with claim 1, wherein the data transmitter is configured to emit, using a further transmission data packet, the transmission time of at least one of the transmission data packets or at least a time gap between two of the transmission data packets.

8. The data transmitter in accordance with claim 1, the data transmitter being configured to predetermine, using a further transmission data packet, to a further data transmitter a transmission time when the further data transmitter emits a transmission data packet or a time gap between two transmission data packets emitted by the further data transmitter.

9. The data transmitter in accordance with claim 1, wherein the transmission element for transmitting data packets is configured to adjust the time gap between the transmission data packets or non-transmitting a transmission data packet in dependence on a quality or occupation of the communications channel.

10. The data transmitter in accordance with claim 1, wherein the data transmitter is a data transceiver further comprising:
    a receive element for receiving data packets, configured to receive a data packet from the first data receiver and to determine a receive power or receive quality;
    wherein the data transmitter is configured to adjust a transmit power with which the transmission data packets are transmitted to the first data receiver in dependence on the determined receive power or receive quality.

11. A system comprising:
    at least one data transmitter in accordance with claim 1; and
    at least one data receiver, the data receiver comprising:
    a receive element for receiving data packets, configured to receive at least three transmission data packets from a first data transmitter, which are transmitted via a communications channel with a time gap and each comprise part of a first data packet, the receive element for receiving data packets being configured to combine the at least three transmission data packets in order to acquire the first data packet;
    wherein the at least three transmission data packets are channel-encoded such that only a portion of the at least three transmission data packets is required for decoding;
    wherein the receive element for receiving data packets is configured to receive, combine and decode at least two of the at least three transmission data packets in order to acquire the first data packet.

12. A method for operating a transmitter of a wireless sensor network, wherein the wireless sensor network comprises a base station and a plurality of sensor nodes, wherein the transmitter is the base station or one of the plurality of sensor nodes, wherein the method comprises:
- generating at least three transmission data packets by splitting a first data packet destined for a first data receiver into the at least three transmission data packets, wherein each of the at least three transmission data packets is shorter than the first data packets, wherein, when generating the at least three transmission data packets, the at least three transmission data packets are channel-encoded such that only a portion of the transmission data packets is required for decoding the first data packet;
- transmitting the at least three transmission data packets in a frequency channel via a communications channel with a time gap;
- monitoring the frequency channel in order to recognize an interference or transmission of a further data transmitter in the frequency channel;
- wherein the transmission element for transmitting data packets is configured not to transmit, transmit only partly or at a later time via the communications channel a transmission data packet, waiting for transmission, of the at least three transmission data packets if an interference or transmission from a further data transmitter is recognized by the monitor element for monitoring the frequency channel at the time of transmitting the transmission data packet;
- wherein, when transmitting the at least three transmission data packets, a transmission data packet, waiting for transmission, of the at least three transmission data packets is not transmitted, transmitted only partly or at a later time if an interference or transmission from a further data transmitter is recognized by monitoring the frequency channel at the time of transmitting the transmission data packet.

13. A non-transitory digital storage medium having stored thereon a computer program for performing a method for operating a transmitter of a wireless sensor network, wherein wireless sensor network comprises a base station and a plurality of sensor nodes, wherein the transmitter is the base station or one of the plurality of sensor nodes, wherein the method comprises:
- generating at least three transmission data packets by splitting a first data packet destined for a first data receiver into the at least three transmission data packets, wherein each of the at least three transmission data packets is shorter than the first data packets, wherein, when generating the at least three transmission data packets, the at least three transmission data packets are channel-encoded such that only a portion of the transmission data packets is required for decoding the first data packet;
- transmitting the at least three transmission data packets in a frequency channel via a communications channel with a time gap;
- monitoring the frequency channel in order to recognize an interference or transmission of a further data transmitter in the frequency channel;
- wherein the transmission element for transmitting data packets is configured not to transmit, transmit only partly or at a later time via the communications channel a transmission data packet, waiting for transmission, of the at least three transmission data packets if an interference or transmission from a further data transmitter is recognized by the monitor element for monitoring the frequency channel at the time of transmitting the transmission data packet;
- wherein, when transmitting the at least three transmission data packets, a transmission data packet, waiting for transmission, of the at least three transmission data packets is not transmitted, transmitted only partly or at a later time if an interference or transmission from a further data transmitter is recognized by monitoring the frequency channel at the time of transmitting the transmission data packet,
- when said computer program is run by a computer.

\* \* \* \* \*